(12) United States Patent
Yasaki

(10) Patent No.: US 11,025,799 B2
(45) Date of Patent: Jun. 1, 2021

(54) IMAGE FORMING APPARATUS CORRECTING MAGNIFICATION OF IMAGE IN SCANNING DIRECTION OF LIGHT BEAM

(71) Applicant: CANON KABUSHIKI KAISHA, Tokyo (JP)

(72) Inventor: Kosuke Yasaki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/936,058

(22) Filed: Mar. 26, 2018

(65) Prior Publication Data
US 2018/0288284 A1    Oct. 4, 2018

(30) Foreign Application Priority Data
Mar. 30, 2017   (JP) .............................. JP2017-068629

(51) Int. Cl.
| | | |
|---|---|---|
| G03G 15/041 | (2006.01) | |
| H04N 1/60 | (2006.01) | |
| G03G 15/04 | (2006.01) | |
| G03G 15/00 | (2006.01) | |
| H04N 1/04 | (2006.01) | |
| H04N 1/393 | (2006.01) | |
| H04N 1/50 | (2006.01) | |
| G03G 15/043 | (2006.01) | |

(52) U.S. Cl.
CPC ......... *H04N 1/6036* (2013.01); *G03G 15/043* (2013.01); *G03G 15/0409* (2013.01); *G03G 15/0415* (2013.01); *G03G 15/04072* (2013.01); *G03G 15/5087* (2013.01); *H04N 1/0432* (2013.01); *H04N 1/3935* (2013.01); *H04N 1/506* (2013.01); *H04N 1/6027* (2013.01); *G03G 2215/00109* (2013.01); *G03G 2215/0404* (2013.01); *H04N 2201/046* (2013.01)

(58) Field of Classification Search
CPC ......... G03G 15/04072; G03G 15/6558; G03G 2215/0158; H04N 1/393; H04N 1/506; H04N 1/6027
USPC .......................... 358/1.2, 1.18, 3.26; 399/301
See application file for complete search history.

(56) References Cited

U.S. PATENT DOCUMENTS

| | | | |
|---|---|---|---|
| 8,027,056 B2 | 9/2011 | Kaji | ............................... 358/1.2 |
| 2004/0160506 A1* | 8/2004 | Maeda | ................. G02B 26/127 347/129 |
| 2016/0246208 A1* | 8/2016 | Nagasaki | ............... H04N 1/387 |

FOREIGN PATENT DOCUMENTS

| | | | |
|---|---|---|---|
| JP | H07-52468 | | 2/1995 |
| JP | 2009-017396 | | 1/2009 |
| JP | 2013107369 A | * | 6/2013 |

* cited by examiner

*Primary Examiner* — Jamares Q Washington
(74) *Attorney, Agent, or Firm* — Venable LLP

(57) ABSTRACT

An image forming apparatus including: a light source configured to emit a light beam based on an image signal; a deflector configured to deflect the light beam so that the light beam emitted from the light source is scanned on a surface of a photosensitive member in a main scanning direction; a storage portion configured to store a first magnification of an image with respect to a scanning position in the main scanning direction; and a controller configured to generate a second magnification of the image with respect to a reference color image, wherein the controller generates a third magnification based on the first magnification corrected based on the second magnification and the second magnification to correct the image signal based on the third magnification.

4 Claims, 20 Drawing Sheets

FIG. 17A PROFILE MAGNIFICATION CORRECTION
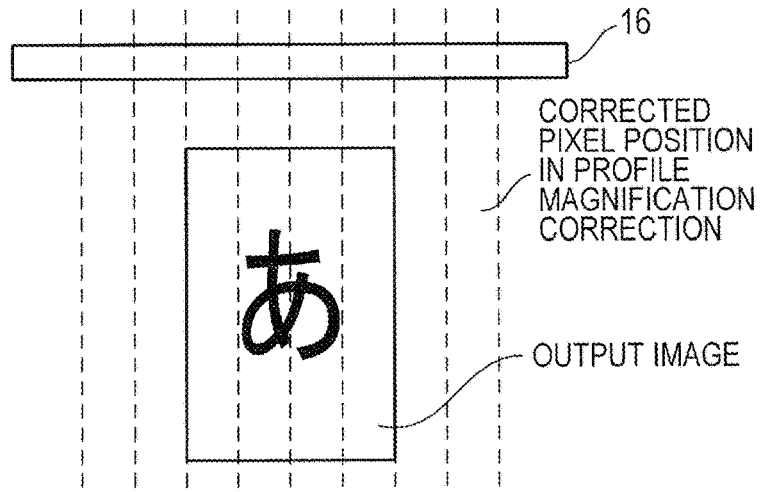
FIG. 17B COMPOSITE MAGNIFICATION CORRECTION
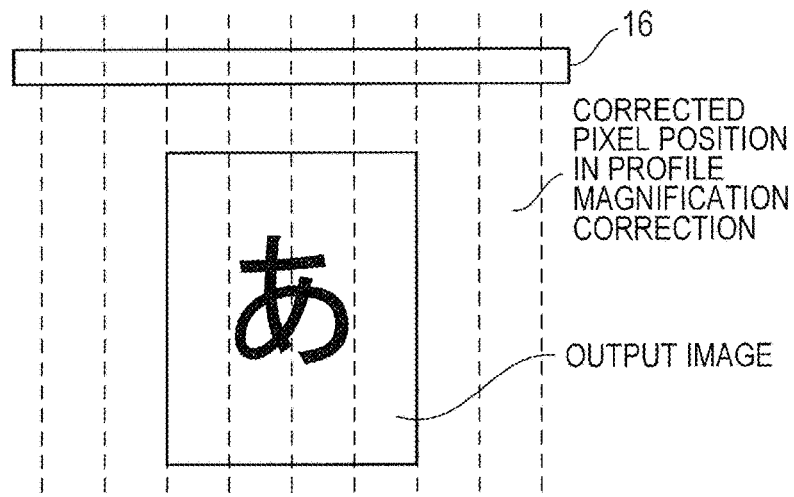
FIG. 17C CORRECTED COMPOSITE MAGNIFICATION CORRECTION
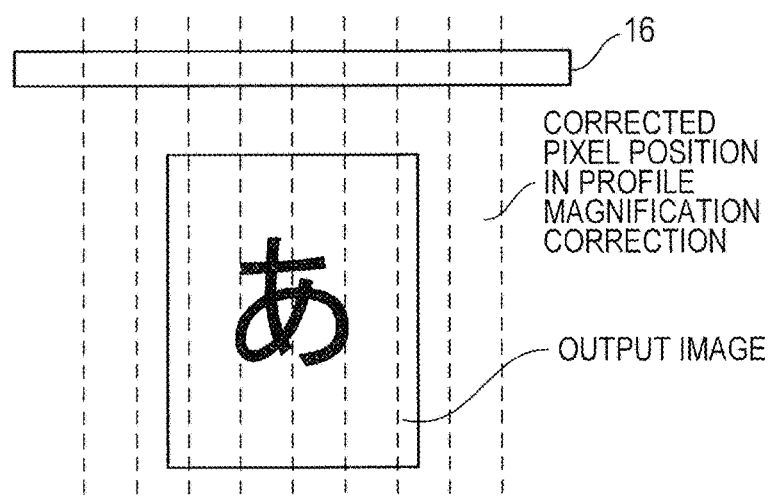

IMAGE FORMING APPARATUS CORRECTING MAGNIFICATION OF IMAGE IN SCANNING DIRECTION OF LIGHT BEAM

BACKGROUND OF THE INVENTION

Field of the Invention

The present invention relates to an image forming apparatus including a deflector configured to deflect a light beam.

Description of the Related Art

An electrophotographic image forming apparatus is configured to deflect a light beam emitted from a light source based on an image signal with a rotary polygon mirror, and cause the deflected light beam to form an image as a light spot scanned on a photosensitive member at a constant speed by an fθ lens. However, a scanning position of the light spot by the fθ lens may be positionally displaced by a part tolerance to distort an output image. To address this problem, in Japanese Patent Application Laid-Open No. 2009-17396, at a time when an image forming apparatus is assembled, a magnification of an image with respect to a scanning position is measured, a measurement result is stored in advance as a profile magnification, and an image signal is corrected based on the profile magnification.

Meanwhile, in an image forming apparatus configured to overlap a plurality of colors with one another to form a color image, a magnification of an image of each color may be changed by a part tolerance, a temperature in use, and a change with time to cause color misregistration among the images of the plurality of colors overlapped with one another. To address this problem, in Japanese Patent Application Laid-Open No. H07-52468, a color misregistration measurement pattern for measuring the color misregistration is formed, and a color misregistration magnification of an image of each color is corrected based on a detection result of the color misregistration measurement pattern.

However, when the magnification of the image with respect to the scanning position and the magnification for correcting the color misregistration are corrected in combination, a position at which the magnification of the image with respect to the scanning position is corrected may be displaced in accordance with the magnification for correcting the color misregistration. The displacement of the corrected position has a problem in that a density variation or moire is caused in the images of the plurality of colors overlapped with one another.

SUMMARY OF THE INVENTION

In view of the above-mentioned circumstances, the present invention provides an image forming apparatus capable of reducing color misregistration at a time when a first magnification and a second magnification of an image in a main scanning direction are corrected in combination.

According to one embodiment of the present invention, there is provided an image forming apparatus comprising:
a light source configured to emit a light beam based on an image signal;
a deflector configured to deflect the light beam so that the light beam emitted from the light source is scanned on a surface of a photosensitive member in a main scanning direction;
a storage portion configured to store a first magnification of an image with respect to a scanning position in the main scanning direction; and
a controller configured to generate a second magnification of the image with respect to a reference color image,
wherein the controller generates a third magnification based on the first magnification corrected based on the second magnification and the second magnification to correct the image signal based on the third magnification.

Further features of the present invention will become apparent from the following description of exemplary embodiments with reference to the attached drawings.

BRIEF DESCRIPTION OF THE DRAWINGS

FIG. 17A, FIG. 17B, and FIG. 17C are diagrams for illustrating relationships between an output image and a corrected pixel position.

DESCRIPTION OF THE EMBODIMENTS

Modes for carrying out the present invention are described below with reference to the accompanying drawings.

First Embodiment (Image Forming Apparatus)

Figure 1:
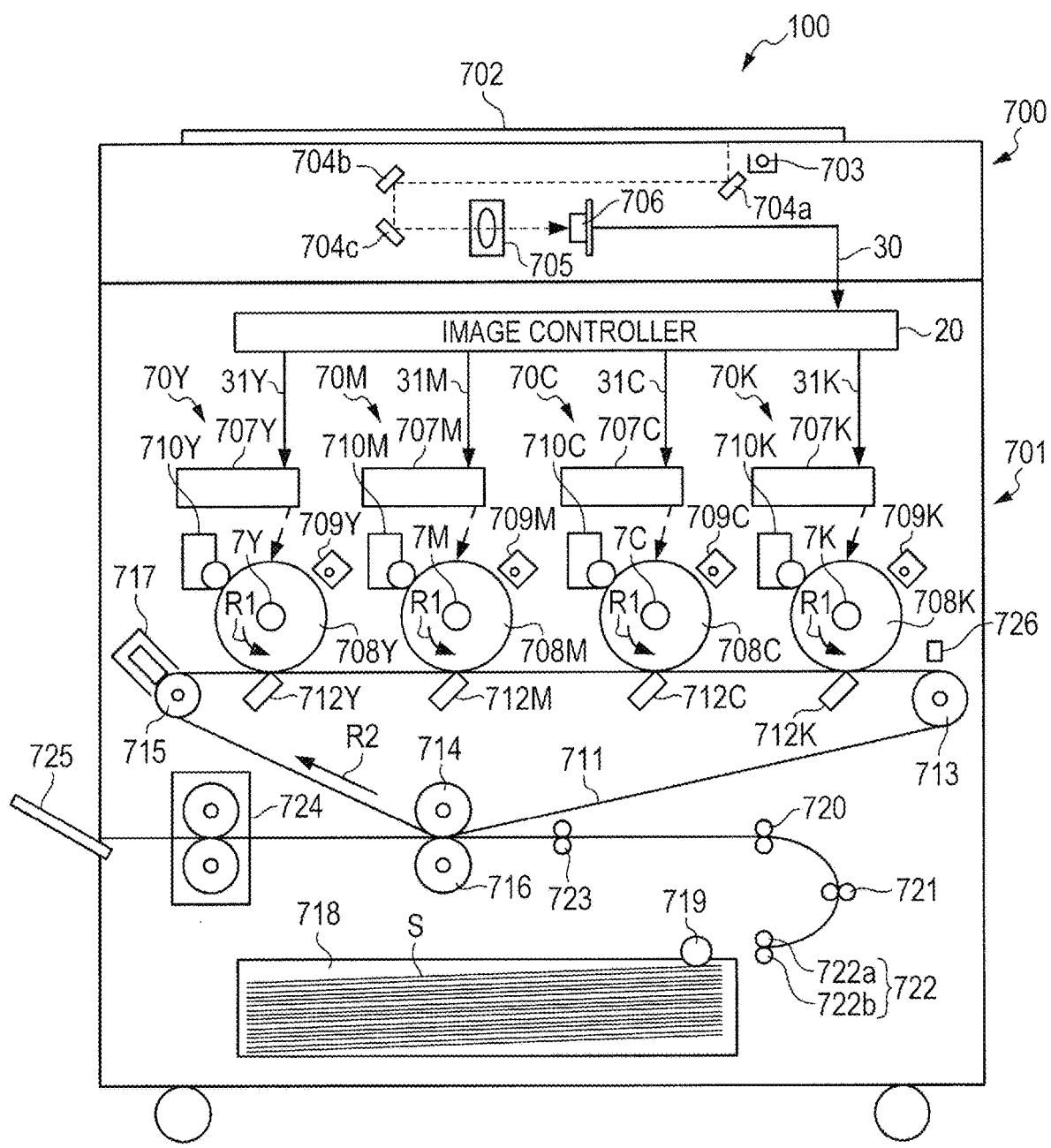
FIG. 1 is a cross-sectional view of an image forming apparatus.

FIG. 1 is a cross-sectional view of an image forming apparatus 100. The image forming apparatus 100 is an electrophotographic digital color printer that uses toners (developers) of a plurality of colors to form a color image on a recording medium (hereinafter referred to as "sheet"). The image forming apparatus 100 includes an image reading unit 700 configured to read an image of an original, and an image forming unit 701 configured to form the image on a sheet.

((Image Reading Unit))

Figure 2:
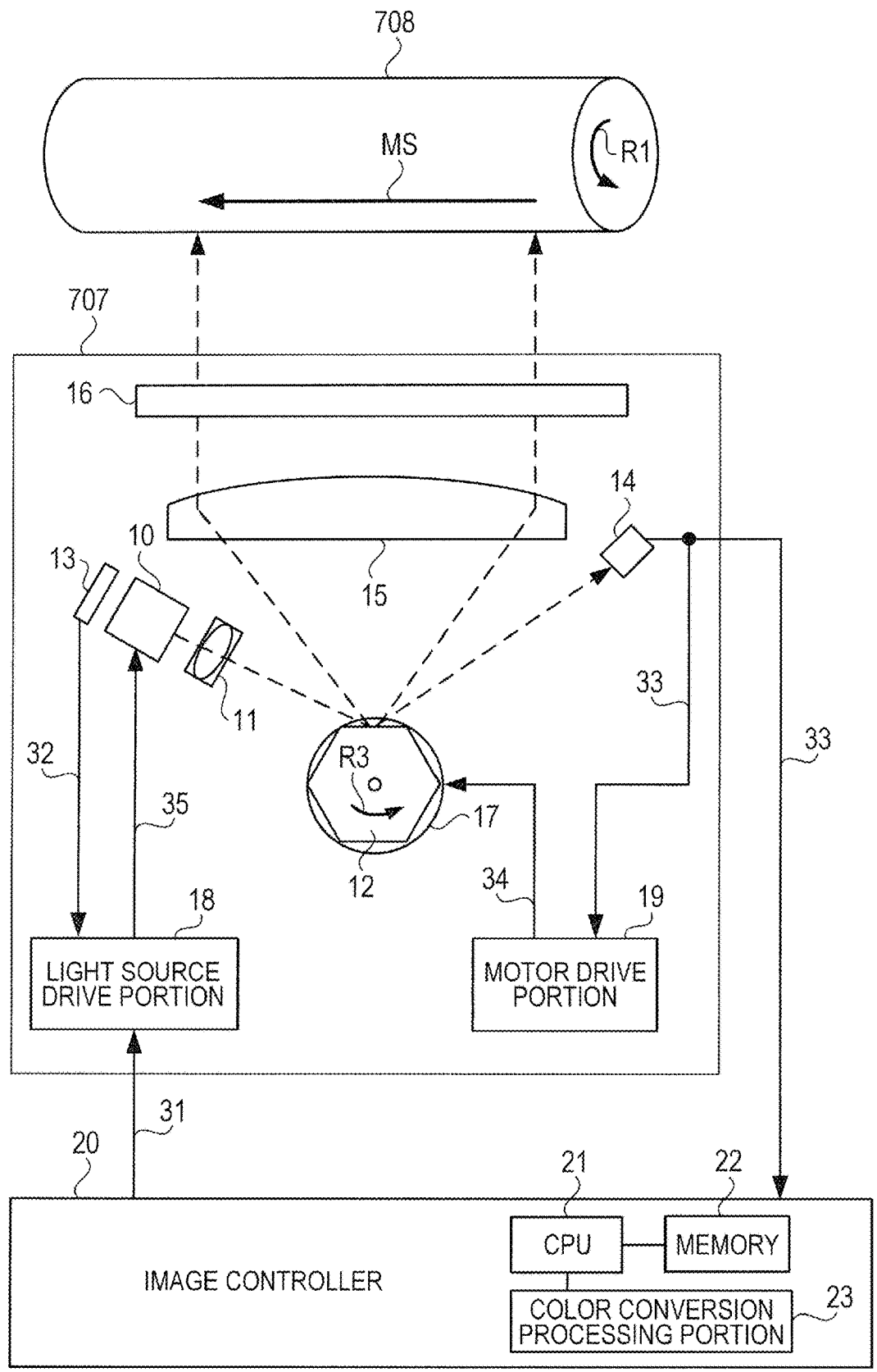
FIG. 2 is a plan view for schematically illustrating components that are arranged inside a light scanning apparatus.

The image reading unit 700 includes an original glass plate 702, an illumination device 703, reflecting mirrors 704a, 704b, and 704c, an imaging lens 705, and an image sensor 706 (e.g., CCD) formed of a plurality of light receivers. The illumination device 703 illuminates the original placed on the original glass plate 702. Light reflected by the original is reflected by the reflecting mirrors 704a, 704b, and 704c to be guided to the imaging lens 705. The imaging lens 705 images the reflected light on the image sensor 706. The image sensor 706 is a photoelectric conversion element. The image sensor 706 separates colors of the reflected light from the original to convert image information of a blue component (B), image information of a green component (G), and image information of a red component (R) into electrical image data 30. The image data 30 output from the image sensor 706 is input to an image controller 20 included in the image forming unit 701. The image controller 20 serving as a controller includes a CPU 21, a memory 22, and a color conversion processing portion 23 (FIG. 2). The color conversion processing portion 23 performs color conversion processing based on an intensity level of each of an image signal of the blue component (B), an image signal of the green component (G), and an image signal of the red component (R) of the image data 30. The color conversion processing portion 23 generates a black (K) image signal 31K, a cyan (C) image signal 31C, a magenta (M) image signal 31M, and a yellow (Y) image signal 31Y. The image signals 31K, 31C, 31M, and 31Y are input to light scanning apparatus (laser scanner units) 707K, 707C, 707M, and 707Y, respectively.

((Image Forming Unit))

The image forming unit 701 includes four image forming portions 70 (70Y, 70M, 70C, and 70K). The image forming portion 70Y forms a yellow image with the use of a yellow toner. The image forming portion 70M forms a magenta image with the use of a magenta toner. The image forming portion 70C forms a cyan image with the use of a cyan toner. The image forming portion 70K forms a black image with the use of a black toner. The suffixes Y, M, C, and K in the reference symbols represent yellow, magenta, cyan, and black, respectively. In the following description, the suffixes Y, M, C, and K in the reference symbols may be omitted when the suffixes are not particularly necessary. The four image forming portions 70 have the same structure except for the color of the toner.

Each image forming portion 70 has a photosensitive drum (image bearing member) 708 serving as a photosensitive member. The photosensitive drum 708 rotates about a rotation axis 7 in a direction indicated by an arrow R1 of FIG. 1 when an image is formed. A charging device 709, the light scanning apparatus 707, a developing device 710, a primary transfer device 712, and a drum cleaning device (not shown) are arranged around the photosensitive drum 708. An endless belt (hereinafter referred to as "intermediate transfer belt") 711 serving as an intermediate transfer member is arranged below the photosensitive drum 708. The intermediate transfer belt 711 is stretched over a drive roller 713, a tension roller 715, and a secondary transfer opposite roller 714. The intermediate transfer belt 711 rotates in a direction indicated by an arrow R2 of FIG. 1 when an image is formed. On an upper surface of a horizontal portion of the intermediate transfer belt 711, a photosensitive drum 708Y, a photosensitive drum 708M, a photosensitive drum 708C, and a photosensitive drum 708K are arranged in the stated order along a rotation direction R2 of the intermediate transfer belt 711. The primary transfer device 712 is opposed to the photosensitive drum 708 through the intermediate transfer belt 711. A secondary transfer roller 716 is opposed to the secondary transfer opposite roller 714 through the intermediate transfer belt 711.

A section that is downstream of the image forming portion 70 and that is near the intermediate transfer belt 711 is provided with pattern detectors (color misregistration measurement sensors) 726, which are optical sensors configured to detect color misregistration measurement patterns (toner images) that are formed on the intermediate transfer belt 711. The color misregistration measurement patterns are formed on the intermediate transfer belt 711 before an image is formed on the sheet or between formation of an image and formation of another image, and are detected by the pattern detectors 726. Detection results of the pattern detectors 726 are used to correct a position and a magnification of an image. A section that is upstream of the image forming portion 70 and that is near the intermediate transfer belt 711 is provided with a belt cleaning device 717 configured to remove residual toner that remains on the intermediate transfer belt 711 after secondary transfer.

A feeding cassette 718 configured to contain sheets S is arranged in a lower part of the image forming apparatus 100. The sheets S are fed from the feeding cassette 718 by a pickup roller 719. The top sheet of the sheets fed by the pickup roller 719 is separated by a separation roller pair 722, which is formed of a feed roller 722a serving as a conveying unit and a retard roller 722b serving as a separation unit. The sheet fed by the separation roller pair 722 is conveyed to a registration roller pair 723 by a plurality of conveying roller pairs 721 and 720. A leading edge of the sheet is abutted against a nip of the registration roller pair 723 that has stopped rotating. When the sheet is formed into a loop, conveyance of the sheet is stopped once. The formation of the loop corrects skew feeding of the sheet. When the registration roller pair 723 starts rotating, the sheet is conveyed to the secondary transfer roller 716. A fixing device 724 is arranged downstream of the secondary transfer roller 716 in a conveying direction of the sheet. A discharge tray 725, on which the sheets with images formed thereon are stacked, is arranged downstream of the fixing device 724 in the conveying direction of the sheet.

(Image Forming Process)

An image forming process of the image forming apparatus 100 is described. The photosensitive drums 708Y, 708M, 708C, and 708K rotate in the direction indicated by the arrow R1 about rotation axes 7Y, 7M, 7C, and 7K thereof, respectively. In the yellow image forming portion 70Y, a charging device 709Y charges a surface of the photosensitive drum 708Y uniformly. The light scanning apparatus 707Y emits laser light (hereinafter referred to as "light beam") that is modulated based on the yellow component image signal 31Y to form an electrostatic latent image on the uniformly charged surface of the photosensitive drum 708Y. A developing device 710Y develops the electrostatic latent image with the use of a yellow toner to obtain a yellow toner image.

Next, in the magenta image forming portion 70M, a charging device 709M charges a surface of the photosensitive drum 708M uniformly. The magenta light scanning apparatus 707M starts emitting a light beam that is modulated based on the magenta component image signal 31M when a first predetermined time period passes after timing at which the yellow light scanning apparatus 707Y starts writing the electrostatic latent image in a sub scanning direction. The light scanning apparatus 707M scans the light beam on the uniformly charged surface of the photosensitive drum 708M in a main scanning direction to form an electrostatic latent image. A developing device 710M develops the electrostatic latent image with the use of a magenta toner to obtain a magenta toner image.

Next, in the cyan image forming portion 70C, a charging device 709C charges a surface of the photosensitive drum 708C uniformly. The cyan light scanning apparatus 707C starts emitting a light beam that is modulated based on the cyan component image signal 31C when a second predetermined time period passes after timing at which the magenta light scanning apparatus 707M starts writing the electrostatic latent image in the sub scanning direction. The light scanning apparatus 707C scans the light beam on the uniformly charged surface of the photosensitive drum 708C in the main scanning direction to form an electrostatic latent image. A developing device 710C develops the electrostatic latent image with the use of a cyan toner to obtain a cyan toner image.

Next, in the black image forming portion 70K, a charging device 709K charges a surface of the photosensitive drum 708K uniformly. The black light scanning apparatus 707K starts emitting a light beam that is modulated based on the black component image signal 31K when a third predetermined time period passes after timing at which the cyan light scanning apparatus 707C starts writing the electrostatic latent image in the sub scanning direction. The light scanning apparatus 707K scans the light beam on the uniformly charged surface of the photosensitive drum 708K in the main scanning direction to form an electrostatic latent image. A developing device 710K develops the electrostatic latent image with the use of a black toner to obtain a black toner image. In the first embodiment, the first predetermined time period, the second predetermined time period, and the third predetermined time period are the same, but may be set to different time periods depending on the structure and conditions of the image forming apparatus 100.

The intermediate transfer belt 711 rotates in the direction indicated by the arrow R2. The yellow toner image on the photosensitive drum 708Y is transferred onto the intermediate transfer belt 711 in a primary transfer portion between the photosensitive drum 708Y and a primary transfer device 712Y. Next, the magenta toner image on the photosensitive drum 708M is transferred in an overlapping manner onto the yellow toner image on the intermediate transfer belt 711 in a primary transfer portion between the photosensitive drum 708M and a primary transfer device 712M. Next, the cyan toner image on the photosensitive drum 708C is transferred in an overlapping manner onto the magenta toner image on the intermediate transfer belt 711 in a primary transfer portion between the photosensitive drum 708C and a primary transfer device 712C. Finally, the black toner image on the photosensitive drum 708K is transferred in an overlapping manner onto the cyan toner image on the intermediate transfer belt 711 in a primary transfer portion between the photosensitive drum 708K and a primary transfer device 712K. In this manner, the toner images of the four colors: yellow, magenta, cyan, and black are transferred onto the intermediate transfer belt 711 while being overlapped with one another in the stated order.

The sheet fed from the feeding cassette 718 waits at the registration roller pair 723. The registration roller pair 723 starts rotating at the right timing such that the toner images on the intermediate transfer belt 711 match a position of the sheet. The sheet is conveyed to a secondary transfer portion between the secondary transfer roller 716 and the secondary transfer opposite roller 714 by the registration roller pair 723. The four-color toner images on the intermediate transfer belt 711 are transferred at once onto the sheet by the secondary transfer roller 716. The sheet with the toner images transferred thereon is conveyed to the fixing device 724 serving as an image fixing unit. The fixing device 724 heats and pressurizes the sheet to fix the toner images to the sheet and form a full-color image on the sheet. The sheet with the image formed thereon is discharged onto the discharge tray 725.

(Light Scanning Apparatus)

The light scanning apparatus 707 serving as light beam emitting devices is described next. FIG. 2 is a plan view for schematically illustrating components that are arranged inside the light scanning apparatus 707. The four light scanning apparatus 707Y, 707M, 707C, and 707K have the same structure. The light scanning apparatus 707 includes a semiconductor laser chip (hereinafter referred to as "light source") 10, a collimator lens 11, a rotary polygon mirror 12, a motor 17 configured to rotate the rotary polygon mirror 12, an fθ lens 15, and a reflecting mirror 16. The light scanning apparatus 707 also includes a beam detector (hereinafter referred to as "BD") 14, and a photodiode (hereinafter referred to as "PD") 13 serving as a light receiver. The light scanning apparatus 707 further includes a light source drive portion (laser driver) 18 configured to drive the light source 10, and a motor drive portion 19 configured to drive the motor 17.

The light source 10 is an edge emitting laser configured to emit light beams in two directions from half mirrors formed on both end surfaces, respectively. The light source 10 is configured to emit a light beam as front light toward the collimator lens 11, and also emit a light beam as rear light toward the PD 13. The front light is guided to the surface of the photosensitive drum 708 to form an electrostatic latent image on the surface of the photosensitive drum 708. The rear light is emitted with a light intensity that is a predetermined ratio of a light intensity of the front light to enter the PD 13 serving as a detector configured to detect the light intensity. In automatic power control (hereinafter referred to as "APC") of the light source 10, when receiving the rear light, the PD 13 serving as a photoelectric conversion unit converts the rear light into an electrical signal. The PD 13 outputs the electrical signal as a detection signal (hereinafter referred to as "PD signal") 32 to the light source drive portion 18. The light source drive portion 18 adjusts the light intensity of the light beam emitted from the light source 10 based on the PD signal 32. The light source 10 in the first embodiment is not limited to an edge emitting laser, but may be a surface emitting laser, for example, a vertical cavity surface emitting laser (VCSEL) or a vertical external cavity surface emitting laser (VECSEL). Moreover, the light source 10 may be a single beam generating unit configured to emit a single light beam, or a multi-beam generating unit configured to emit a plurality of light beams.

The light source 10 emits the light beam based on the image signal 31 of the corresponding color component. The collimator lens 11 converts the light beam emitted from the light source 10 into a substantially parallel light beam. The motor drive portion 19 outputs an acceleration/deceleration signal (hereinafter referred to as "drive signal") 34 to the motor 17, which is integrally formed with the rotary polygon mirror 12 serving as a deflector, to rotate the rotary polygon mirror 12 at a predetermined speed in a direction indicated by an arrow R3 of FIG. 2. The light beam forms an image on a reflecting surface of the revolving rotary polygon mirror 12, and is deflected by the rotary polygon mirror 12. The light beam reflected by the rotary polygon mirror 12 passes through the fθ lens 15, is reflected by the reflecting mirror 16, and forms an image as a light spot that travels on the photosensitive drum 708 in the main scanning direction indicated by an arrow MS of FIG. 2 at a constant speed. The fθ lens 15 converts the light beam that has been scanned at a constant angular velocity by the rotary polygon mirror 12 into the light spot that travels in the main scanning direction MS at the constant speed.

The light beam emitted from the light source 10 outside an image forming area is reflected by the rotary polygon mirror 12, and enters the BD 14. The BD 14 serving as a beam detector receives the light beam, and outputs a synchronization signal (hereinafter referred to as "BD signal") 33 for making constant a writing start position of an electrostatic latent image on the photosensitive drum 708, which is scanned with the light beam at a constant position in the main scanning direction. The BD signal 33 is input to the motor drive portion 19 and the image controller 20. The motor drive portion 19 executes feedback control of a rotation speed of the motor 17 such that a period of the BD signal 33 is stabilized at a predetermined period. The image controller 20 outputs the image signal 31 to the light source drive portion 18 based on the BD signal 33. After executing the APC, the light source drive portion 18 determines light beam emission start timing based on the BD signal 33, and starts writing an image. In this manner, writing start positions in the main scanning direction of the image are matched.

The light source drive portion 18 outputs, to the light source 10, a drive signal 35 for flashing the light source 10 based on the image signal 31 output from the image controller 20. The light source drive portion 18 drives the light source 10 based on the image signal 31 at timing at which the light beam is scanned on an image forming area of the photosensitive drum 708. The light source 10 emits the light beam modulated based on the image signal 31. The light spot of the light beam emitted from the light source 10 and deflected by the rotary polygon mirror 12 travels on the surface of the photosensitive drums 708, which is charged uniformly by the charging device 709, in parallel to the rotation axis 7 of the photosensitive drum 708 in a linear pattern at a constant speed. An electric potential on the surface of the photosensitive drum 708 varies depending on the intensity of the light beam. The photosensitive drum 708 is repeatedly scanned with the light beam in the main scanning direction MS while being rotated in the sub-scanning direction R1, which is perpendicular to the main scanning direction MS, with the result that the electrostatic latent image is formed in the sub-scanning direction R1.

(Magnification Correction of Image)

Figure 3:
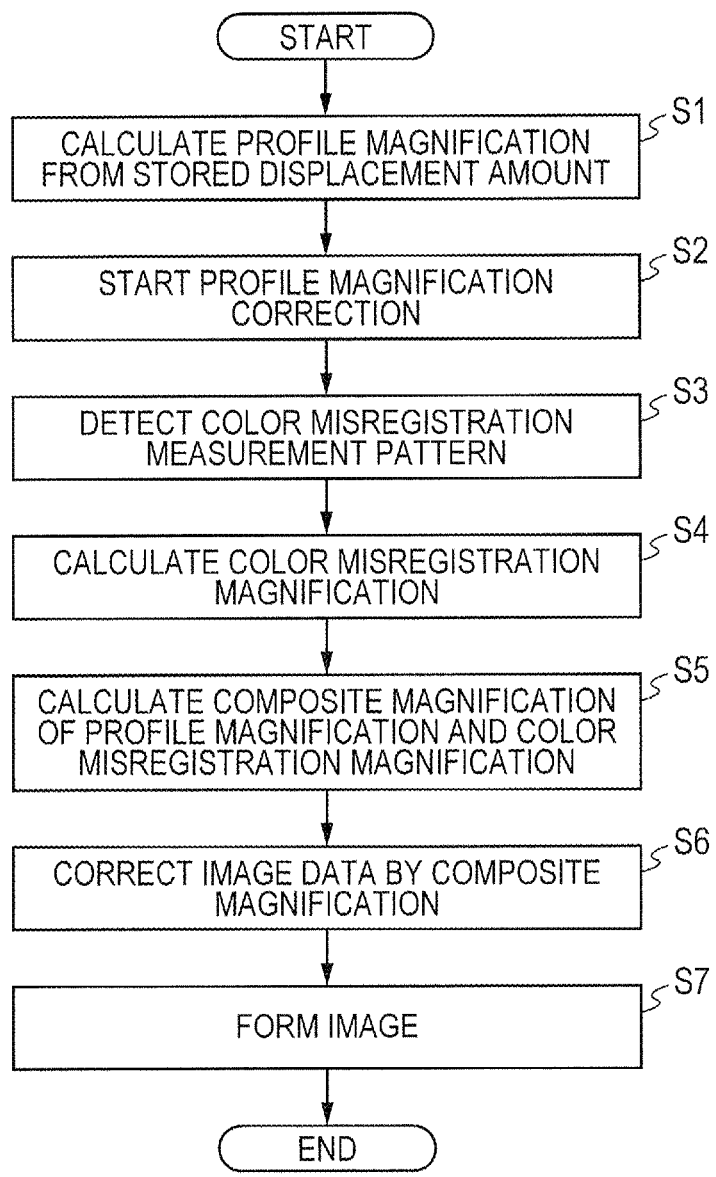
FIG. 3 is a flowchart for illustrating magnification correction operation on an image in a main scanning direction.

However, depending on an individual difference of the fθ lens 15, a temperature change, or a change with time, the images of the respective colors may not be overlapped with one another correctly in the main scanning direction MS to cause color misregistration in some cases. In order to avoid the color misregistration, a magnification in the main scanning direction MS of an image is corrected. Now, referring to FIG. 3, magnification correction on an image in the main scanning direction MS is described. FIG. 3 is a flowchart for illustrating magnification correction operation on an image in the main scanning direction MS.

((Profile Magnification Correction))

First, in order to correct color misregistration caused by a component that cannot be completely corrected by the fθ lens 15 or an individual difference at the time of production, the light beam of the light scanning apparatus 707 is measured in advance by a profile measuring device 40, and a measurement result is stored in the memory 22. At the time of image formation, the measurement result is read from the memory 22, and the image data is corrected based on a magnification of a profile determined based on the measurement result. The profile is magnification property information indicating a magnification with respect to a position (hereinafter referred to as "scanning position") X in the main scanning direction MS for each light scanning apparatus 707. A correction amount for correcting the magnification of the profile is hereinafter referred to as "profile magnification (first magnification) Mag_P". Correction of the image data based on the profile magnification Mag_P is referred to as "profile magnification correction". The profile magnification correction allows the light spot that forms an image on the photosensitive drum 708 to travel at the constant speed. A measurement operation using the profile measuring device 40 is performed before the light scanning apparatus 707 is assembled into the image forming apparatus 100.

Figure 4A:
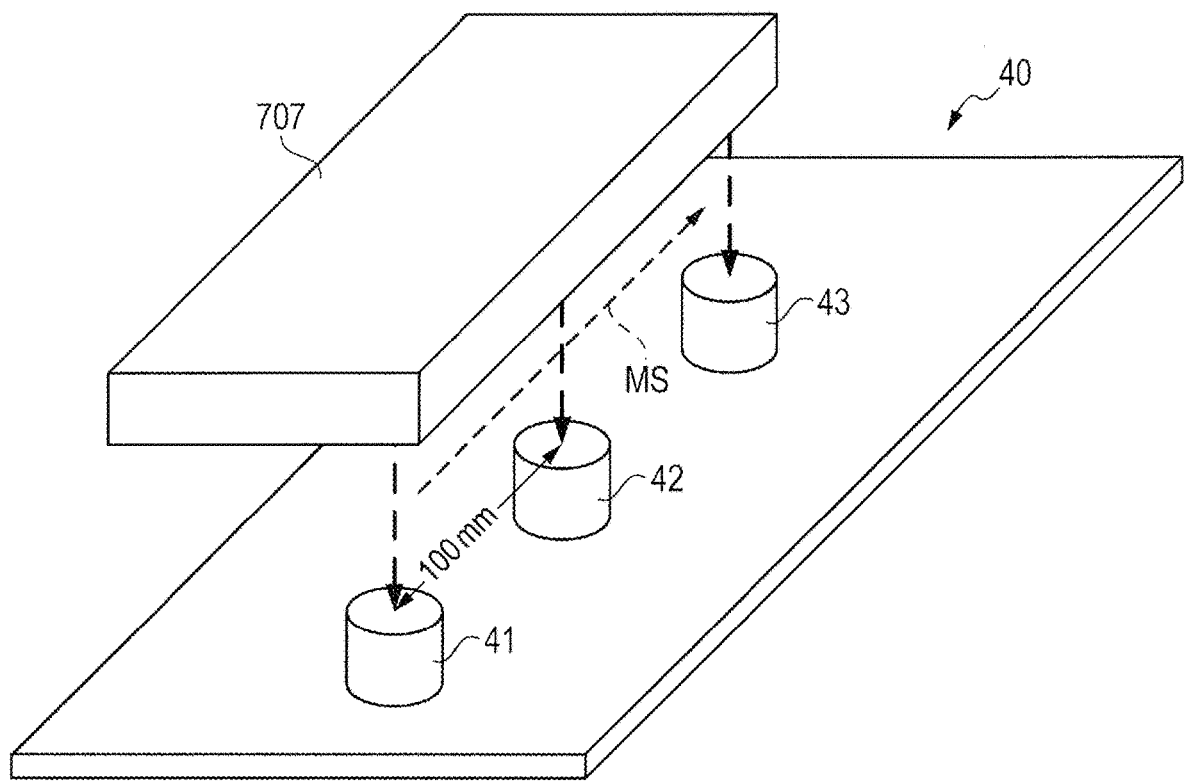
FIG. 4A and FIG. 4B are an explanatory view and an explanatory diagram of a profile measuring device, respectively.
Figure 4B:
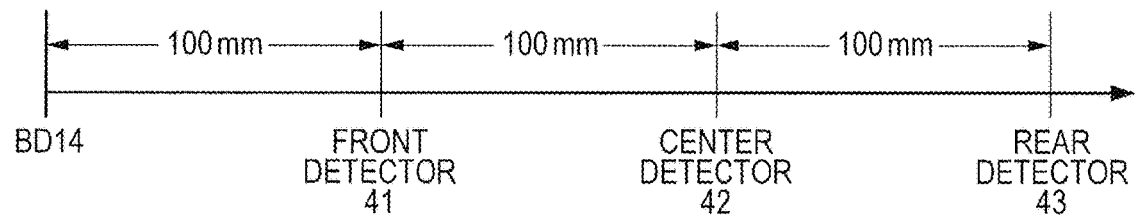

FIG. 4A and FIG. 4B are an explanatory view and an explanatory diagram of the profile measuring device 40, respectively. FIG. 4A is a perspective view of the profile measuring device 40. The profile measuring device 40 includes a front detector 41, a center detector 42, and a rear detector 43, which are arrayed in line in the main scanning direction MS. FIG. 4B is a diagram for illustrating a positional relationship among the BD 14, which is provided in the light scanning apparatus 707, and the front detector 41, the center detector 42, and the rear detector 43, which are provided in the profile measuring device 40. From upstream to downstream in the main scanning direction MS, the BD 14, the front detector 41, the center detector 42, and the rear detector 43 are arranged in the stated order at the same interval Sx. In the first embodiment, the interval (inter-detector distance) Sx is set to 100 mm, but the present invention is not limited thereto.

When the light beam emitted from the light scanning apparatus 707 passes above the front detector 41, the center detector 42, and the rear detector 43, each of the front detector 41, the center detector 42, and the rear detector 43 outputs an electrical signal. Times Tf, Tc, and Tr at which the light beam passes above the front detector 41, the center detector 42, and the rear detector 43, respectively, are measured with reference to the BD signal 33 output from the BD 14. The time Tf is the time it takes for the light beam to travel from the BD 14 to the front detector 41. The time Tc is the time it takes for the light beam to travel from the BD 14 to the center detector 42. The time Tr is the time it takes for the light beam to travel from the BD 14 to the rear detector 43. Displacement amounts ΔSf, ΔSc, and ΔSr of the light beam with respect to the scanning position X in the main scanning direction MS are determined based on the times Tf, Tc, and Tr. The scanning position X has its origin (X=0) at the position of the center detector 42. The scanning position X of the front detector 41 is -Sx (X=-Sx). The scanning position X of the rear detector 43 is Sx (X=Sx). The displacement amount ΔSf indicates a displacement amount from an ideal scanning position at a time when the light beam is at the scanning position X=-Sx. The displacement amount ΔSc indicates a displacement amount from an ideal scanning position at a time when the light beam is at the scanning position X=0. The displacement amount ΔSr indicates a displacement amount from an ideal scanning position at a time when the light beam is at the scanning position X=Sx. When a light beam scanning speed is represented by V, the displacement amounts ΔSf, ΔSc, and ΔSr are expressed by the following expressions.

$$\Delta Sf = Sx - (Tf \times V)$$

$$\Delta Sc = (2 \times Sx) - (Tc \times V)$$

$$\Delta Sr = (3 \times Sx) - (Tr \times V)$$

For example, when the scanning speed V is 1 mm/μs, the interval (inter-detector distance) Sx is 100 mm, and the time Tf at which the light beam passes above the front detector 41 is 101 μs, the displacement amount ΔSf is -1 mm.

Figure 5:
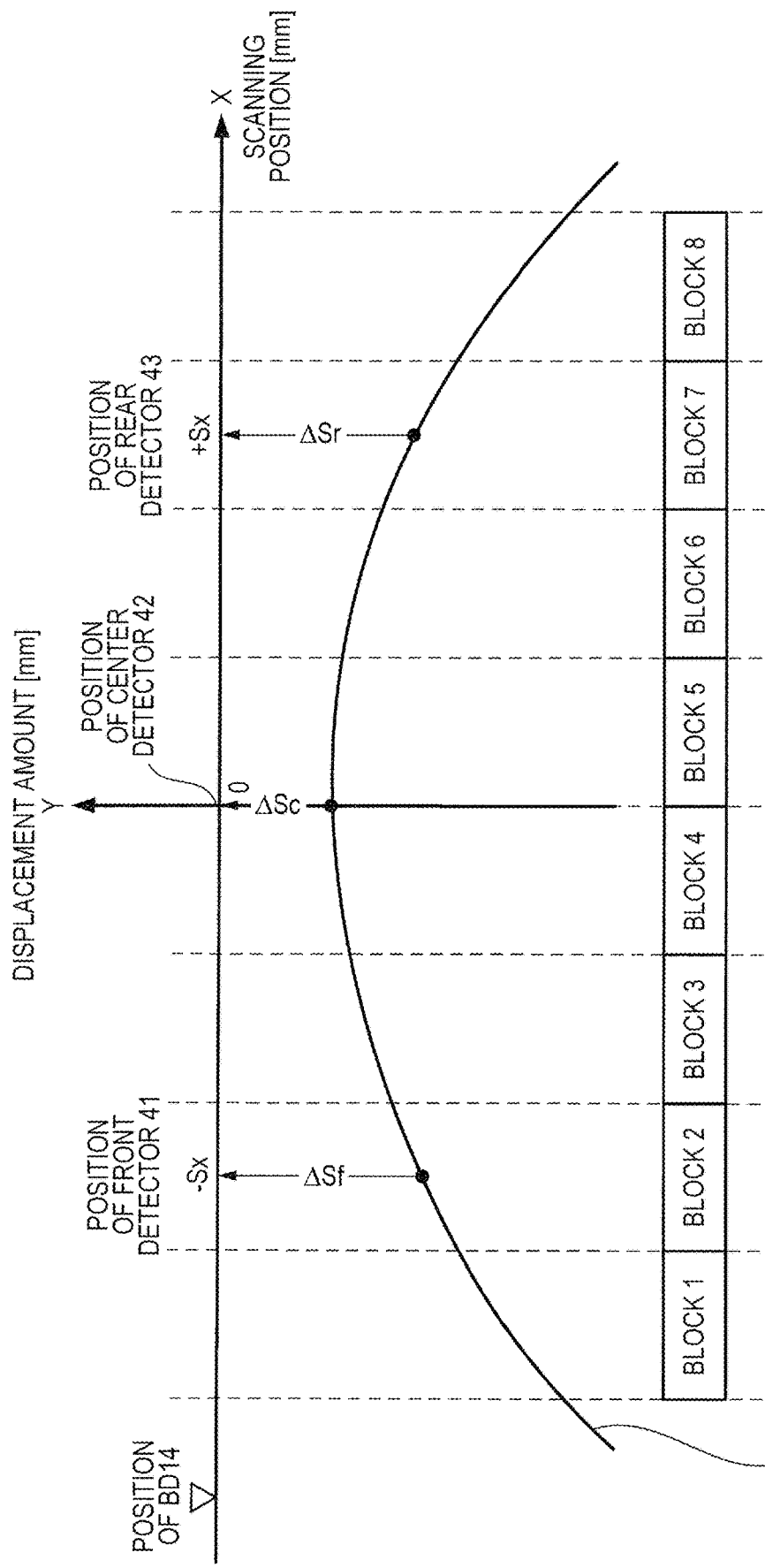
FIG. 5 is a graph for showing a displacement amount with respect to a scanning position.

The measured values of the displacement amounts ΔSf, ΔSc, and ΔSr are stored in the memory (storage portion) 22 of the image controller 20. The values of the displacement amounts ΔSf, ΔSc, and ΔSr are used in correcting the magnification of a pixel in the main scanning direction MS based on the profile during the image formation (hereinafter referred to as "profile magnification correction"). When image forming operation is started, the CPU 21 starts the magnification correction operation in accordance with the flowchart of FIG. 3. The CPU 21 reads the values of the displacement amounts ΔSf, ΔSc, and ΔSr from the memory 22. The CPU 21 calculates a displacement amount Y with respect to the scanning position X based on the values of the displacement amounts ΔSf, ΔSc, and ΔSr. FIG. 5 is a graph for showing the displacement amount Y with respect to the scanning position X. When measurement results of the three detectors: the front detector 41, the center detector 42, and the rear detector 43 are used, an approximation of the displacement amount Y with respect to the scanning position X is expressed as a quadratic. The displacement amount Y with respect to the scanning position X is expressed by Expression 1 below.

$$Y = \frac{\Delta Sr + \Delta Sf - 2\Delta Sc}{2 \times S_x^2} x^2 + \frac{\Delta Sr - \Delta Sf}{2 \times S_x} x + \Delta Sc \quad \text{(Expression 1)}$$

In the first embodiment, a scanning area in the main scanning direction MS is divided into eight areas (hereinafter referred to as "blocks") (Block 1 to Block 8). A displacement amount Mag_Block(N) is set for each block. In the first embodiment, Block 1 to Block 8 are set to have the same width, and Block 1 to Block 8 are arranged at equal intervals. However, the width (interval) of the block may be set smaller toward ends with a larger variation in displacement amount. The displacement amount Mag_Block(N) of each block is expressed by Expression 2 below.

$$\text{Mag\_Block}(N) = \frac{Y(n) - Y(n+1)}{\text{Block\_Width}(N)} \quad \text{(Expression 2)}$$

In Expression 2, N represents a block number, and n represents a coordinate at the left end of Block N. Y(n) represents a displacement amount at the left end of Block N, and Y(n+1) represents a displacement amount at the left end of Block N+1. Block_Width(N) represents a width of Block N.

Figure 6:
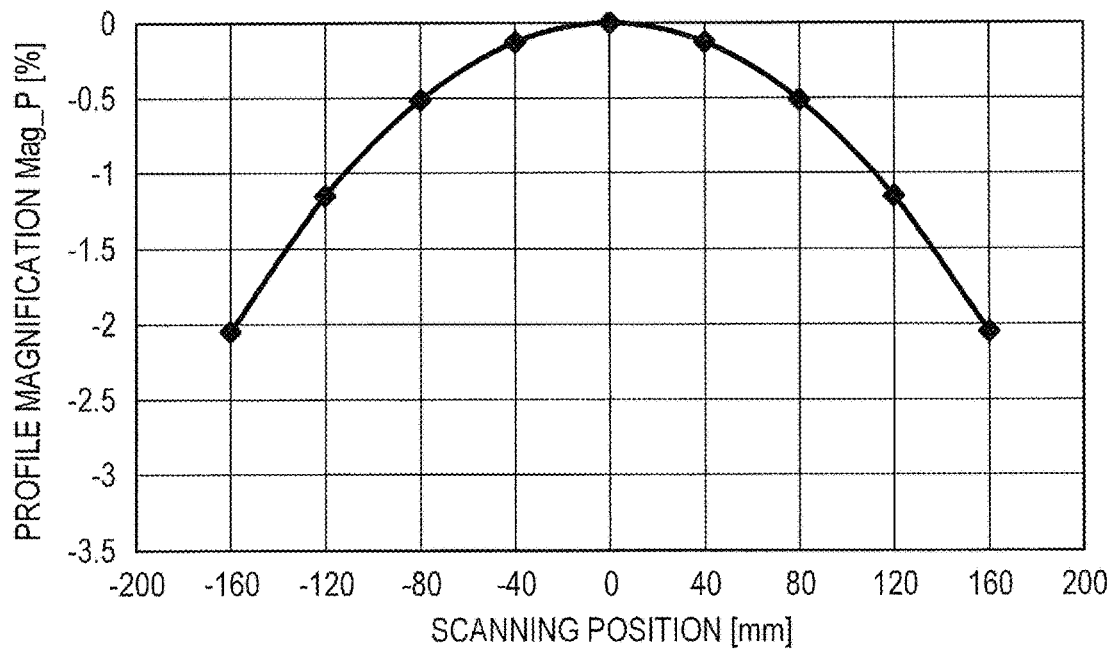
FIG. 6 is a graph for showing a profile magnification with respect to the scanning position.

For example, when the measurement results of the displacement amounts are ΔSf=-0.32 mm, ΔSc=0 mm, and ΔSr=-0.32 mm, and a scanning area of 320 mm is divided into eight blocks, the profile magnification Mag_P as shown in FIG. 6 is obtained. FIG. 6 is a graph for showing the profile magnification Mag_P (%) with respect to the scanning position X mm. The CPU 21 calculates the profile magnification Mag_P based on the values of the displacement amounts ΔSf, ΔSc, and ΔSr stored in the memory 22 (Step S1). In the first embodiment, the profile magnification Mag_P is set for each block based on the displacement amount Mag_Block(N) of each block. The CPU 21 starts the profile magnification correction for correcting the image data based on the profile magnification set for each block (Step S2). Through the correction of the image data at each scanning position X based on the profile magnification Mag_P set for each block, the color misregistration caused by the component that cannot be completely corrected by the fθ lens 15 or an individual difference at the time of production can be corrected. When a calculation speed of the CPU 21 with respect to a printing speed is sufficiently fast, the profile magnification Mag_P may be set for each pixel based on Expression 1. The CPU 21 executes the calculation of the profile magnification Mag_P and the profile magnification correction, which have been described above, for the light scanning apparatus 707 of each color.

((Color Misregistration Magnification Correction))

Figure 7:
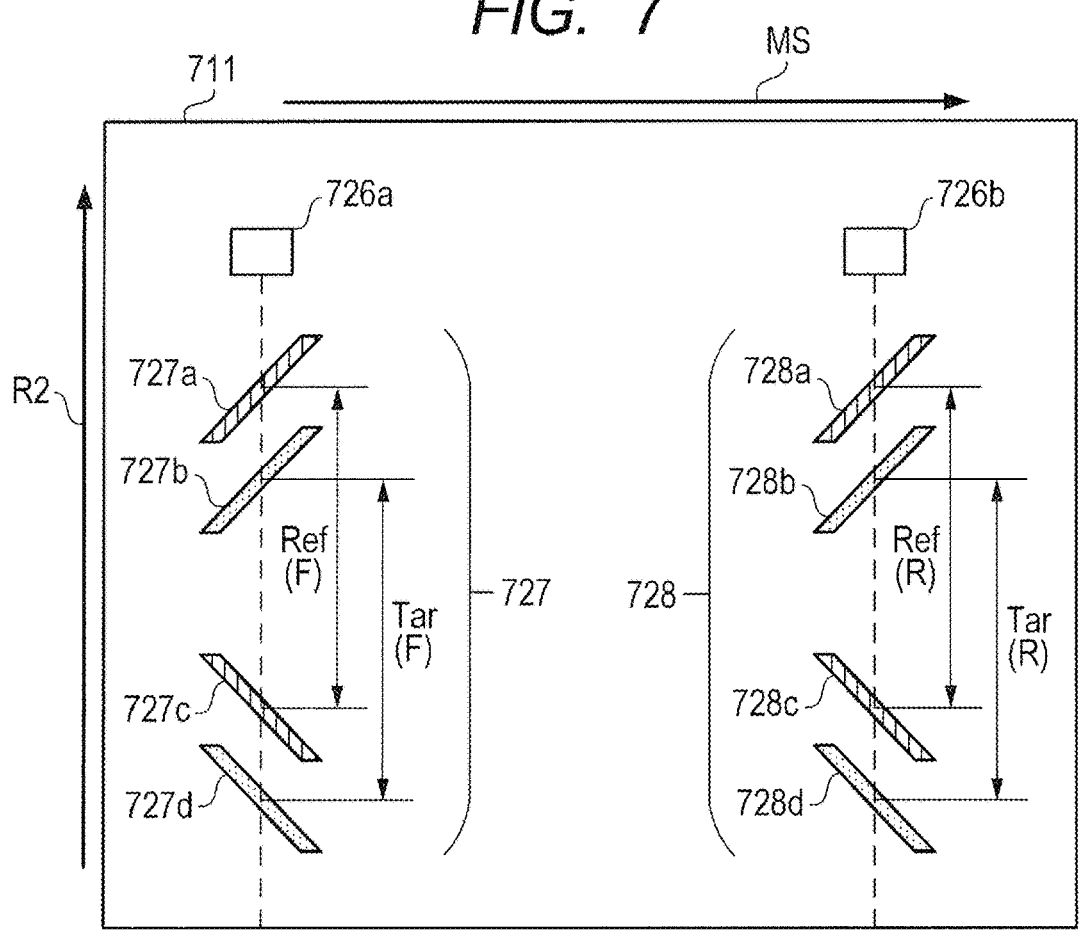
FIG. 7 is a diagram for illustrating color misregistration measurement patterns and pattern detectors.

In order to correct a magnification that varies depending on the temperature, the change with time, and other such factors, the CPU 21 corrects the image data. A correction amount for correcting the magnification that varies depending on the temperature, the change with time, and other such factors are hereinafter referred to as "color misregistration magnification (second magnification) Mag_I". The correction of the image data based on the color misregistration magnification Mag_I is referred to as "color misregistration magnification correction". In the color misregistration magnification correction, the color misregistration measurement patterns are formed on the intermediate transfer belt 711 with the use of the image data that has been subjected to the profile magnification correction. The CPU 21 detects the color misregistration measurement patterns with the pattern detectors 726 (Step S3). FIG. 7 is a diagram for illustrating color misregistration measurement patterns 727 and 728 and pattern detectors 726*a* and 726*b*. Color misregistration magnification correction of a target color image corrects the displacement amount with respect to a reference color image. Yellow is hereinafter referred to as "reference color", and colors (magenta, cyan, and black) other than the reference color are hereinafter referred to as "target colors". In steps similar to those in the case where the toner images are transferred to the sheet, the color misregistration measurement patterns as the toner images are formed on the intermediate transfer belt 711 by the primary transfer device 712, and the color misregistration measurement patterns are detected by the pattern detectors 726 provided at an end of the intermediate transfer belt 711. As illustrated in FIG. 7, the pattern detectors 726 include a front pattern detector 726a on an upstream side (hereinafter referred to as "front side") in the main scanning direction MS, and a rear pattern detector 726b on a downstream side (hereinafter referred to as "rear side") in the main scanning direction MS. At each of positions on the intermediate transfer belt 711 that pass below the front pattern detector 726a and the rear pattern detector 726b, the color misregistration measurement patterns 727 and 728, which are the same patterns, are formed. The color misregistration measurement patterns 727 on the front side include reference color patterns (first patterns) 727a and 727c having oblique line shapes, and target color patterns (second patterns) 727b and 727d having oblique line shapes. Similarly, the color misregistration measurement patterns 728 on the rear side include reference color patterns (first patterns) 728a and 728c having oblique line shapes, and target color patterns (second patterns) 728b and 728d having oblique line shapes. An interval between the reference color patterns 727a and 727c (728a and 728c), and an interval between the target color patterns 727b and 727d (728b and 728d) are measured to measure the displacement amount in the main scanning direction MS of an image of a target color with respect to an image of the reference color.

Now, there is described measurement of the displacement amount (positional displacement amount) in the main scanning direction MS of an image of magenta as a target color with respect to an image of yellow as the reference color. The front pattern detector 726a detects an interval Ref(F) between yellow reference color patterns 727a and 727c and an interval Tar(F) between magenta target color patterns 727b and 727d. Similarly, the rear pattern detector 726b detects an interval Ref(R) between yellow reference color patterns 728a and 728c and an interval Tar(R) between magenta (M) target color patterns 728b and 728c.

The displacement amount $\Delta Rf$ of magenta with respect to yellow on the front side is expressed as follows.

$$\Delta Rf=(Tar(F)-Ref(F))/2$$

The displacement amount $\Delta Rr$ of magenta with respect to yellow on the rear side is expressed as follows.

$$\Delta Rr=(Tar(R)-Ref(R))/2$$

Figure 8:
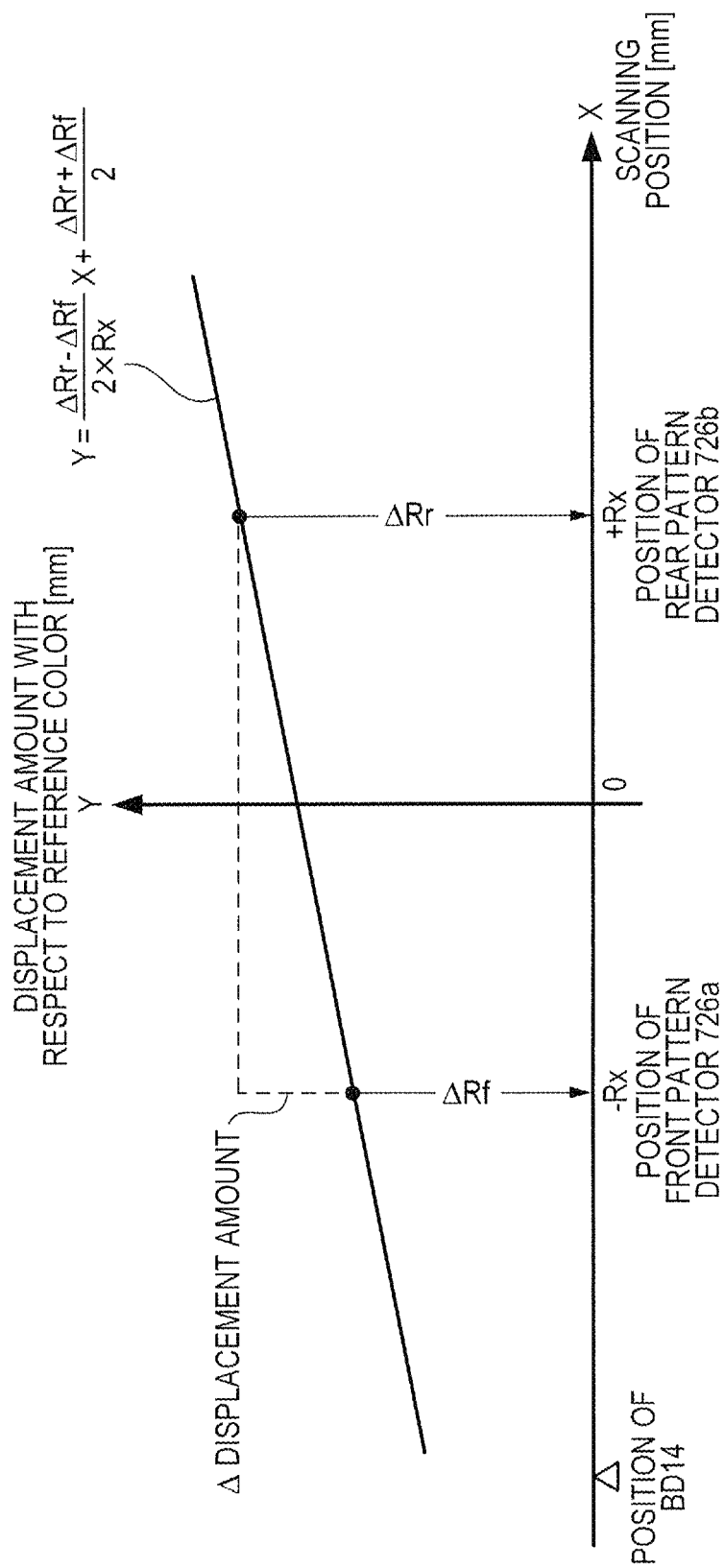
FIG. 8 is a graph for showing a displacement amount with respect to the scanning position.

The scanning position X at which the front pattern detector 726a is arranged is represented by $-Rx$, and the scanning position X at which the rear pattern detector 726b is arranged is represented by $+Rx$. FIG. 8 is a graph for showing the displacement amount with respect to the scanning position X. The number of points of measurement of the displacement amount is two, and hence the displacement amount Y in the main scanning direction MS of the target color with respect to the reference color is expressed as the following approximation of a linear function as shown in FIG. 8.

$$Y = \frac{\Delta Rr - \Delta Rf}{2 \times R_x} x + \frac{\Delta Rr + \Delta Rf}{2}$$

In accordance with the approximation of the linear function above, a rate of change of the displacement amount Y is constant in all areas of the scanning position X in the main scanning direction MS. A $\Delta$ displacement amount, which is a difference between the displacement amount $\Delta Rf$ on the front side and the displacement amount $\Delta Rr$ on the rear side in the main scanning direction MS, is obtained from an interval ($2 \times Rx$) between the front pattern detector 726a and the rear pattern detector 726b by the following expression.

$$\Delta \text{Displacement Amount} = \frac{\Delta Rr - \Delta Rf}{2 \times R_x}(-R_x) + \frac{\Delta Rr - \Delta Rf}{2} - \left(\frac{\Delta Rr - \Delta Rf}{2 \times R_x}(+R_x) + \frac{\Delta Rr + \Delta Rf}{2}\right) = \Delta Rf - \Delta Rr$$

The CPU 21 calculates the color misregistration magnification Mag_I based on the displacement amount $\Delta Rf$ and the displacement amount $\Delta Rr$ (Step S4). The color misregistration magnification Mag_I (%) is expressed as Expression 3 below.

$$\text{Mag\_I} = \frac{\Delta Rf - \Delta Rr}{2 \times R_x} \times 100 \quad \text{(Expression 3)}$$

For example, it is assumed that Rx=100 mm, that the interval between the front pattern detector 726a and the rear pattern detector 726b is 200 mm ($2 \times Rx$=200 mm), that $\Delta Rf$=2 mm, and that $\Delta Rr$=−2 mm. Based on Expression 3, the color misregistration magnification Mag_I is 2%. The detection and the calculation of the color misregistration measurement patterns 727 and 728 are performed also for remaining cyan and black to determine the color misregistration magnification Mag_I for each color. Color misregistration magnification correction for yellow, which is the reference color, is not performed, and color misregistration magnification correction is performed so as to match colors other than yellow to the reference color. In this manner, the CPU 21 serving as a color misregistration magnification generating portion generates the color misregistration magnification (second magnification) Mag_I of the target color image with respect to the reference color image based on detection results of the color misregistration measurement patterns 727 and 728.

((Composite Magnification Correction))

The CPU 21 composites the profile magnification Mag_P and the color misregistration magnification Mag_I, which have been determined as described above, to calculate a composite magnification (third magnification) Mag with respect to each scanning position X (Step S5). The composite magnification Mag is expressed as Expression 4 below.

$$Mag = \left(\left(1 + \frac{\text{Mag\_P}}{100}\right)\left(1 + \frac{\text{Mag\_I}}{100}\right) - 1\right) \times 100 \quad \text{(Expression 4)}$$

The image data is corrected based on the composite magnification Mag, which is determined as described above (Step S6). The image is formed on the sheet based on the corrected image data (Step S7). An image with reduced color misregistration can be formed by correcting the image data based on the composite magnification Mag.

Figure 9:
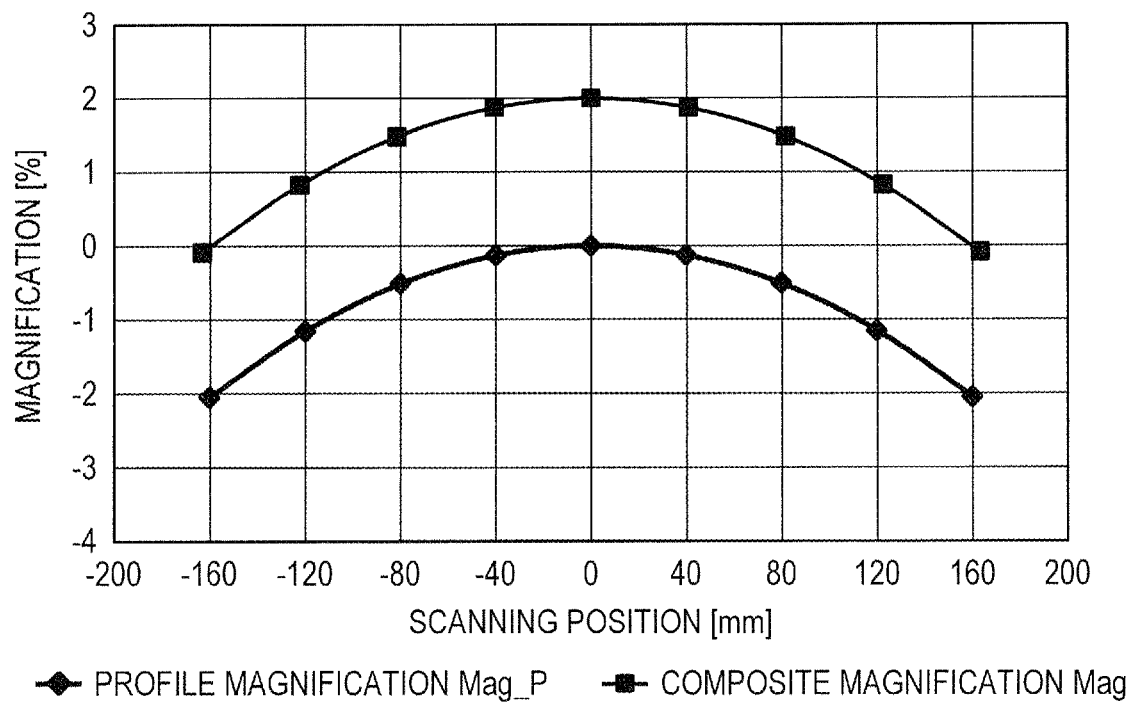
FIG. 9 is a graph for showing a profile magnification and a composite magnification with respect to the scanning position.
Figure 10:
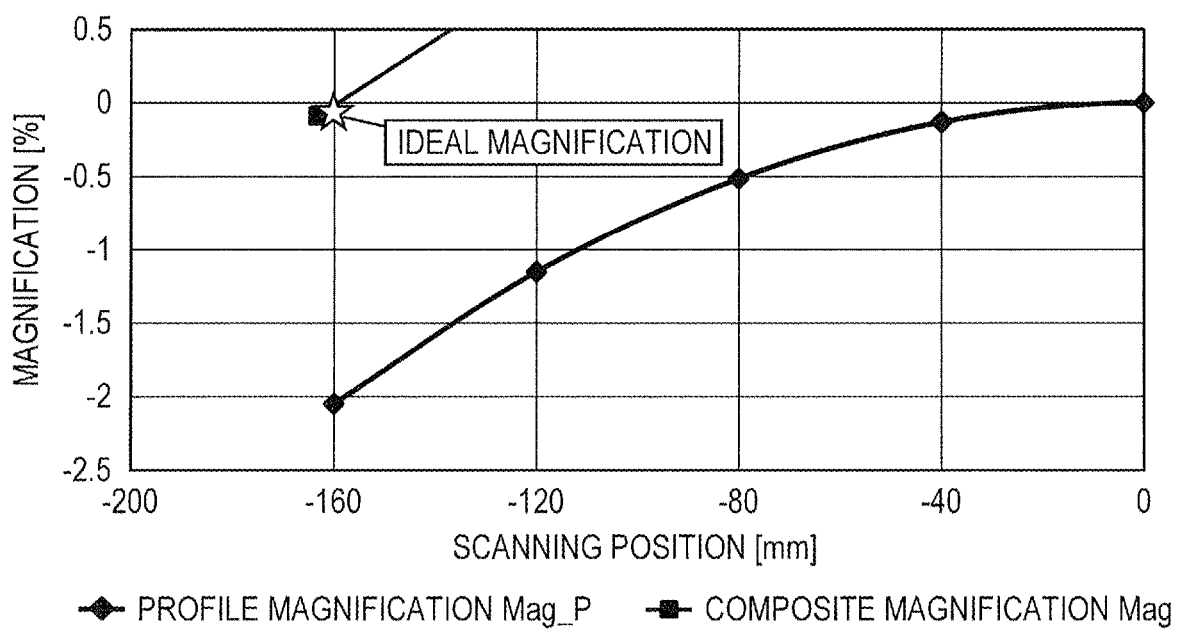
FIG. 10 is an enlarged graph for showing an end of the profile magnification and the composite magnification with respect to the scanning position.

FIG. 9 is a graph for showing the profile magnification Mag_P and the composite magnification Mag with respect to the scanning position X. The composite magnification Mag is generated by compositing the color misregistration magnification Mag_I of +2% with the profile magnification Mag_P. Along with enlargement in the main scanning direction MS of the image, which is caused by the correction of the image data based on the color misregistration magnification Mag_I, a corrected pixel position (first pixel position) based on the composite magnification Mag is displaced in the main scanning direction MS with respect to a corrected position of the image data based on the profile magnification Mag_P. FIG. is an enlarged graph of an end of the profile magnification Mag_P and the composite magnification Mag with respect to the scanning position X. As shown in FIG. 10, the displacement in the main scanning direction MS of the corrected pixel position (first pixel position) of the composite magnification Mag with respect to a corrected pixel position (second pixel position) of the profile magnification Mag_P is small, and hence does not pose a problem.

(Magnification Correction in Light Scanning Apparatus without fθ Lens)

Figure 11:
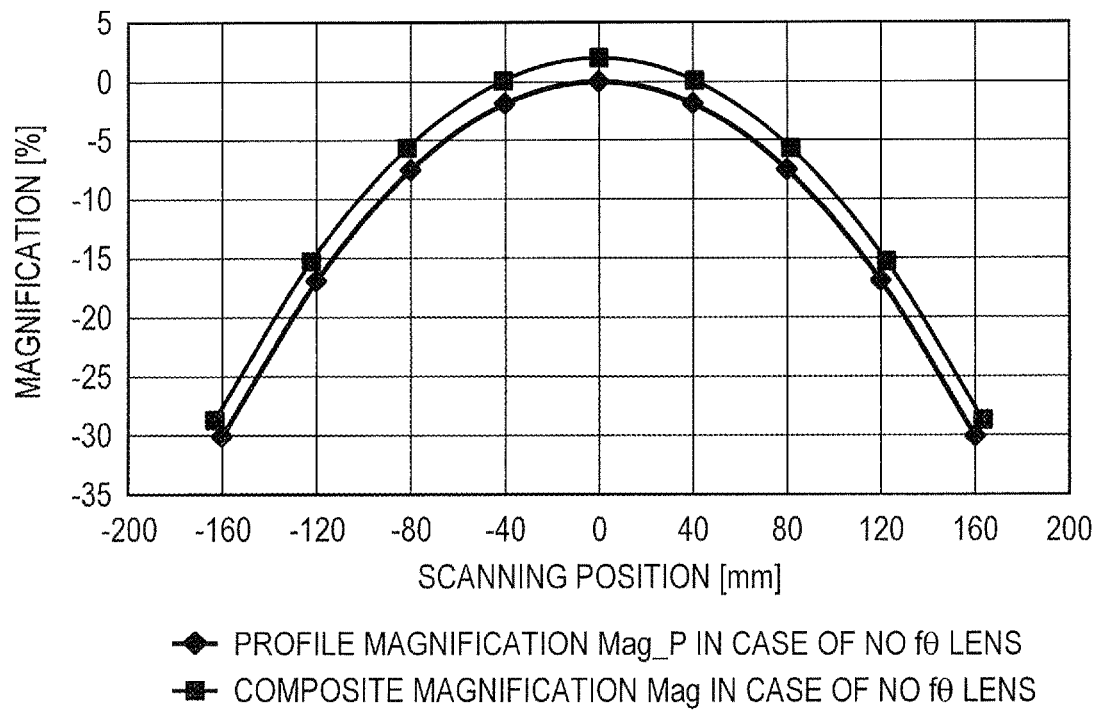
FIG. 11 is a graph for showing a profile magnification and a composite magnification with respect to the scanning position in a case of no fθ lens.
Figure 12:
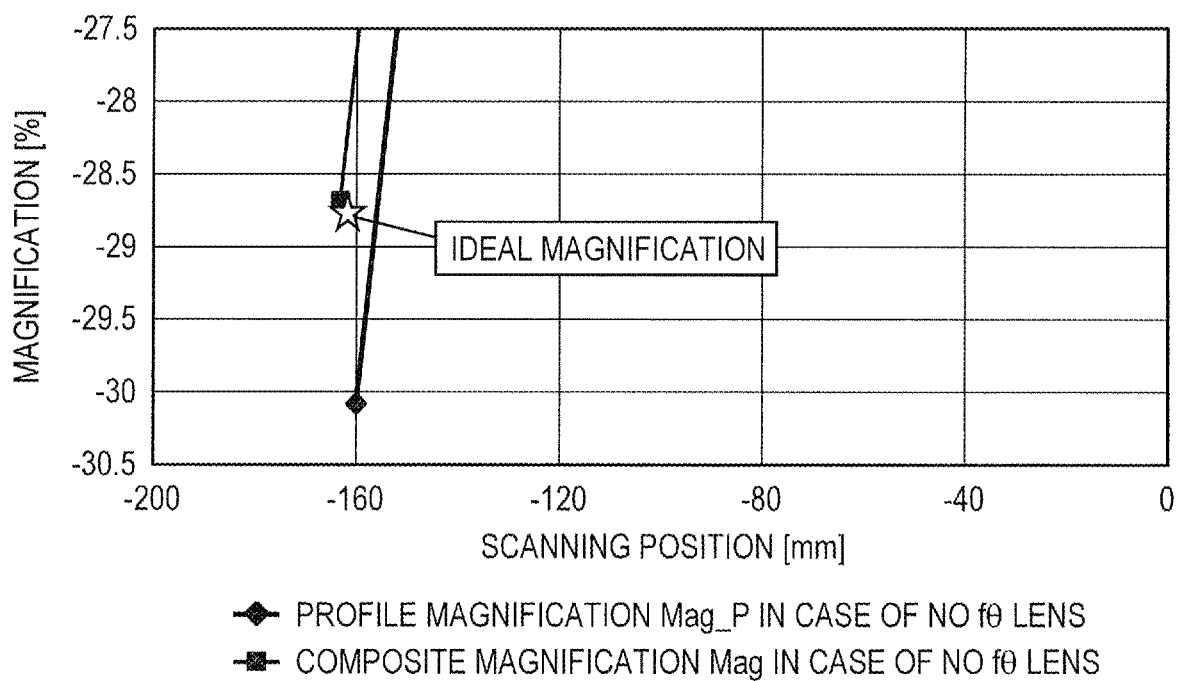
FIG. 12 is an enlarged graph of an end of the profile magnification and the composite magnification with respect to the scanning position in the case of no fθ lens.

In recent years, however, in order to reduce cost, the fθ lens 15 is omitted from the light scanning apparatus 707. The fθ lens 15 has a function of converting the light beam that rotates at the constant angular velocity into the light spot that travels on the photosensitive drum 708 at the constant speed. In the light scanning apparatus 707 without the fθ lens 15, image displacement is corrected through the profile magnification correction, and hence the profile magnification (correction amount) becomes larger as compared to the case of the light scanning apparatus 707 with the fθ lens 15. When the profile magnification (correction amount) is increased, displacement of a pixel position in the profile magnification correction poses a problem. FIG. 11 is a graph for showing a profile magnification Mag_P and a composite magnification Mag with respect to the scanning position X in a case of no fθ lens 15. FIG. 12 is an enlarged graph of an end of the profile magnification Mag_P and the composite magnification Mag with respect to the scanning position X in the case of no fθ lens 15. As shown in FIG. 11, the profile magnification Mag_P of the image forming apparatus 100 without the fθ lens 15 is significantly increased as compared to the profile magnification Mag_P of the image forming apparatus 100 with the fθ lens 15, which is shown in FIG. 9. Displacement in the main scanning direction MS of the corrected pixel position (first pixel position) of the composite magnification Mag with respect to the corrected pixel position (second pixel position) of the profile magnification Mag_P, which is shown in FIG. 12, is large as compared to the displacement in the case of the image forming apparatus 100 with the fθ lens 15, which is shown in FIG. 10. Due to the displacement of the corrected pixel position, the color misregistration cannot be corrected sufficiently in some cases.

To address this problem, in the first embodiment, before the profile magnification Mag_P and the color misregistration magnification Mag_I are composited to generate the composite magnification Mag, the profile magnification Mag_P is corrected based on the color misregistration magnification Mag_I. As a result, even when the profile magnification Mag_P is large, the color misregistration of an image can be reduced.

((Correction of Profile Magnification Based on Color Misregistration Magnification))

Figure 13:
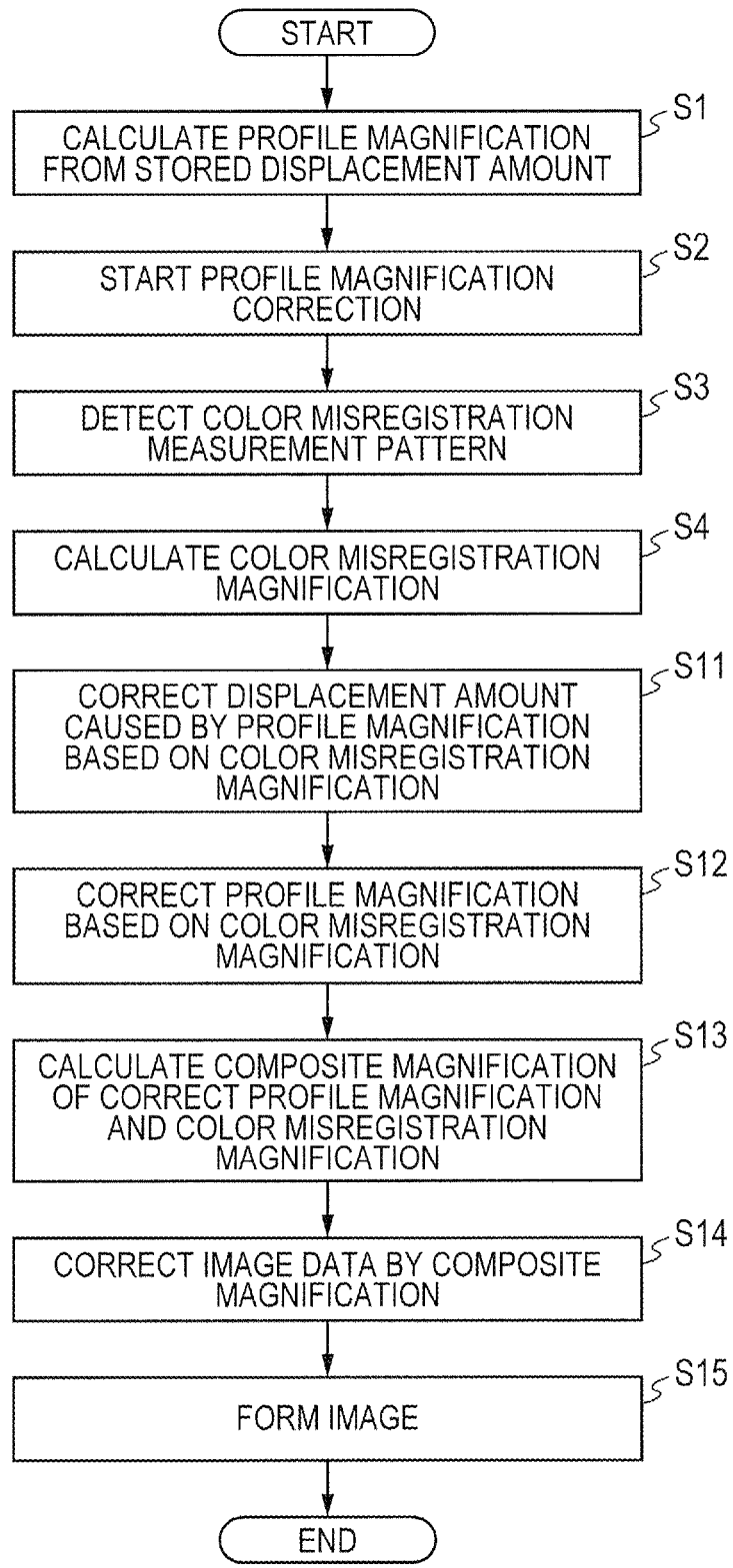
FIG. 13 is a flowchart for illustrating magnification correction operation on an image in the main scanning direction in the case of no fθ lens.

FIG. 13 is a flowchart for illustrating magnification correction operation on an image in the main scanning direction MS in the case of no fθ lens 15. Steps S1 to S4 of FIG. 13 are the same as Steps S1 to S4 of FIG. 3, and hence descriptions thereof are omitted. Based on the color misregistration magnification Mag_I determined based on Expression 3, the displacement amount Y caused by the profile magnification determined based on Expression 1 is corrected (Step S11). The CPU 21 calculates the displacement amount Y with respect to the scanning position X based on the values of the displacement amounts ΔSf, ΔSc, and ΔSr and the color misregistration magnification Mag_I. The displacement amount Y with respect to the scanning position X is expressed by Expression 5 below.

$$Y = \frac{\Delta Sr + \Delta Sf - 2\Delta Sc}{2 \times S_x^2}\left(x \times \left(1 + \frac{\text{Mag\_I}}{100}\right)\right)^2 + \frac{\Delta Sr - \Delta Sf}{2 \times S_x}\left(x + \left(1 + \frac{\text{Mag\_I}}{100}\right)\right) + \Delta Sc \quad \text{(Expression 5)}$$

Figure 14:
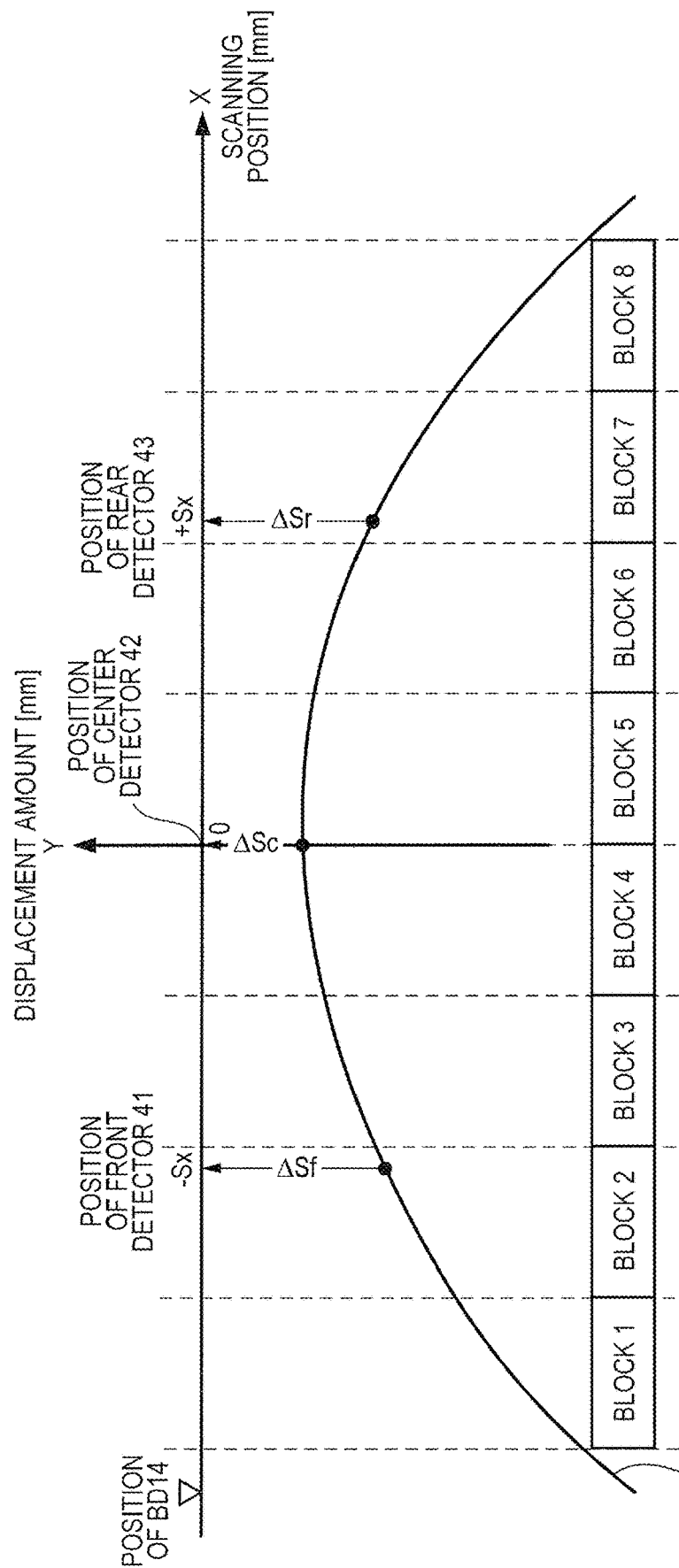
FIG. 14 is a graph for showing a corrected displacement amount with respect to the scanning position.

FIG. 14 is a graph for showing the corrected displacement amount Y with respect to the scanning position X. As shown in FIG. 14, the scanning position X is corrected based on the color misregistration magnification Mag_I. The displacement amount Mag_Block(N) of each block is determined by substituting the displacement amount Y determined based on Expression 5 into Expression 2. The CPU 21 sets the profile magnification Mag_P for each block based on the displacement amount Mag_Block(N) of each block. In this manner, the CPU 21 corrects the profile magnification Mag_P based on the color misregistration magnification (Step S12).

In the first embodiment, Expression 1 is modified with the color misregistration magnification Mag_I to obtain Expression 5. However, Expression 2 may be modified with the color misregistration magnification Mag_I to obtain the following expression for determining the displacement amount Mag_Block(N) of each block.

$$\text{Mag\_Block}(N) = \frac{Y(n) - Y(n+1)}{\text{Block\_Width}(N) \div \left(1 + \frac{\text{Mag\_I}}{100}\right)}$$

The CPU 21 may set the profile magnification Mag_P for each block based on the displacement amount Mag_Block(N) of each block that is corrected based on the color misregistration magnification Mag_I. Also in this manner, the CPU 21 can correct the profile magnification Mag_P based on the color misregistration magnification.

Figure 15:
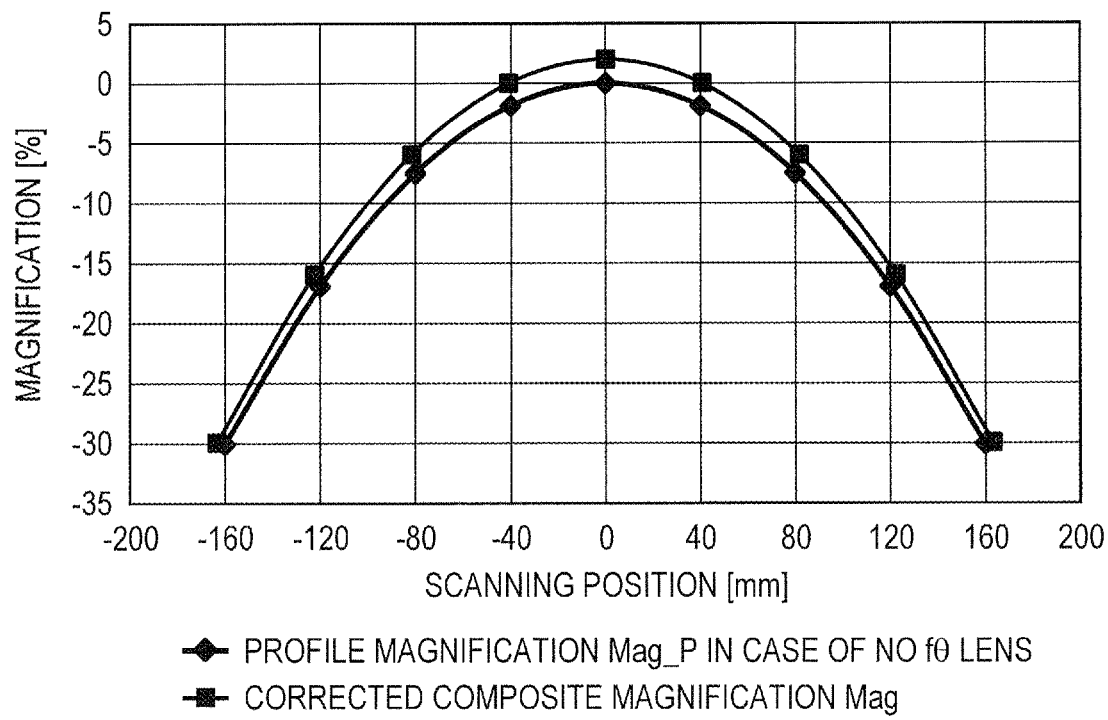
FIG. 15 is a graph for showing a profile magnification and a corrected composite magnification with respect to the scanning position.
Figure 16:
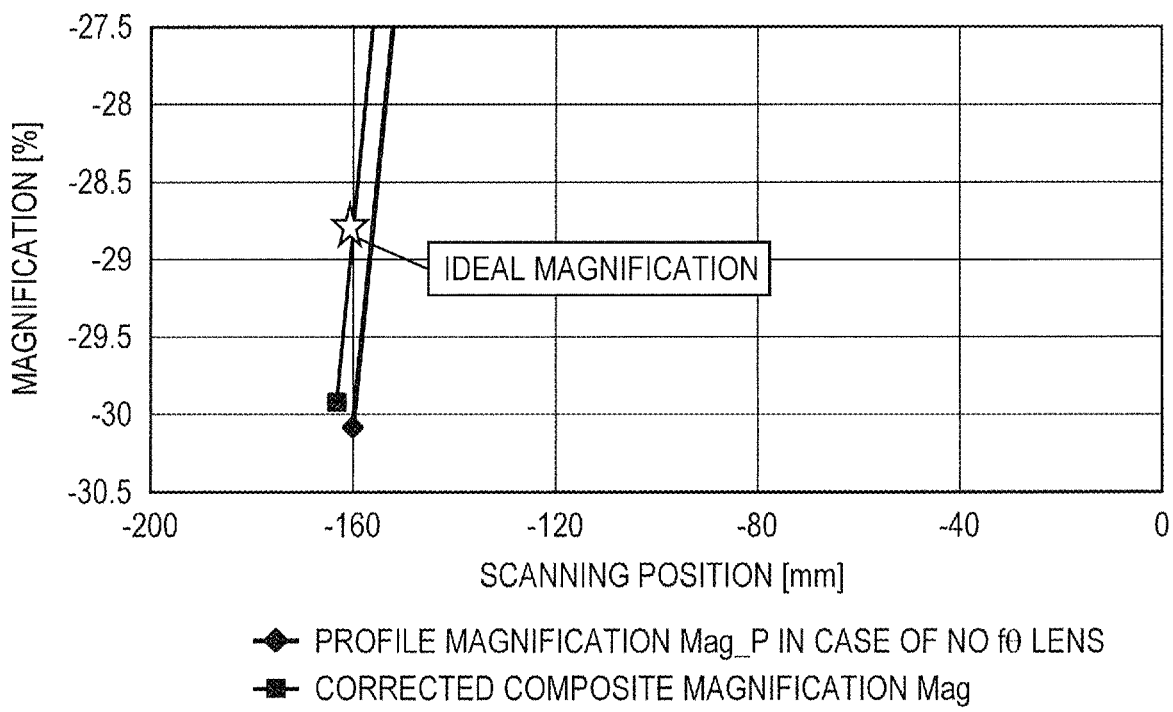
FIG. 16 is an enlarged graph of an end of the profile magnification and the corrected composite magnification with respect to the scanning position.

The CPU 21 calculates the composite magnification Mag of the profile magnification Mag_P corrected based on the color misregistration magnification Mag_I and the color misregistration magnification Mag_I based on Expression 4 (Step S13). FIG. 15 is a graph for showing the profile magnification Mag_P and the corrected composite magnification Mag with respect to the scanning position X. FIG. 16 is an enlarged graph of an end of the profile magnification Mag_P and the corrected composite magnification Mag with respect to the scanning position X. The corrected composite magnification Mag shown in FIG. 15 and FIG. 16 is generated by compositing the profile magnification Mag_P corrected based on the color misregistration magnification Mag_I and the color misregistration magnification Mag_I. The corrected composite magnification Mag has a smaller error from an ideal magnification as compared to the composite magnification Mag shown in FIG. 12, and hence the color misregistration of the color image formed on the sheet can be reduced.

FIG. 17A and FIG. 17B are diagrams for illustrating relationships between an output image and the corrected pixel position. FIG. 17A is a diagram for illustrating a relationship between the output image that has been subjected to the profile magnification correction without the color misregistration magnification correction and the corrected pixel position. FIG. 17B is a diagram for illustrating a relationship between the output image that has been subjected to composite magnification correction of the profile magnification correction and the color misregistration magnification correction and the corrected pixel position. When the composite magnification correction is executed, as illustrated in FIG. 17B, the output image and the corrected pixel position in the profile magnification correction are both scaled with the color misregistration magnification in the main scanning direction MS. FIG. 17C is a diagram for illustrating a relationship between the output image that has been subjected to the composite magnification correction of the profile magnification correction corrected by the color misregistration magnification correction and the color misregistration magnification correction and the corrected pixel position. When the composite magnification correction corrected by the color misregistration magnification correction is executed, as illustrated in FIG. 17C, the output image is scaled, but the corrected pixel position in the profile magnification correction is unchanged. Therefore, through the execution of the corrected composite magnification correction, the image can be corrected at an appropriate magnification, and the color misregistration can be reduced.

The CPU 21 corrects the image data based on the corrected composite magnification Mag (Step S14). The image is formed on the sheet based on the corrected image data (Step S15). Through the correction of the image data based on the composite magnification Mag of the profile magnification correction corrected by the color misregistration magnification correction and the color misregistration magnification correction, the image with the reduced color misregistration can be formed.

According to the first embodiment, there can be reduced the color misregistration in the case where the profile magnification (first magnification) and the color misregistration magnification (second magnification) of the image in the main scanning direction are corrected in combination.

Second Embodiment

Now, a second embodiment of the present invention is described. In the second embodiment, structures similar to those in the first embodiment are denoted by similar reference symbols, and descriptions thereof are omitted. The image forming apparatus 100, the image forming process, and the light scanning apparatus 707 in the second embodiment are similar to those in the first embodiment, and hence descriptions thereof are omitted. In the second embodiment, the composite magnification correction by the image controller 20 is described. The calculation of the profile magnification, the color misregistration magnification, and the composite magnification is similar to that in the first embodiment, and hence a description thereof is omitted.

Figure 18:
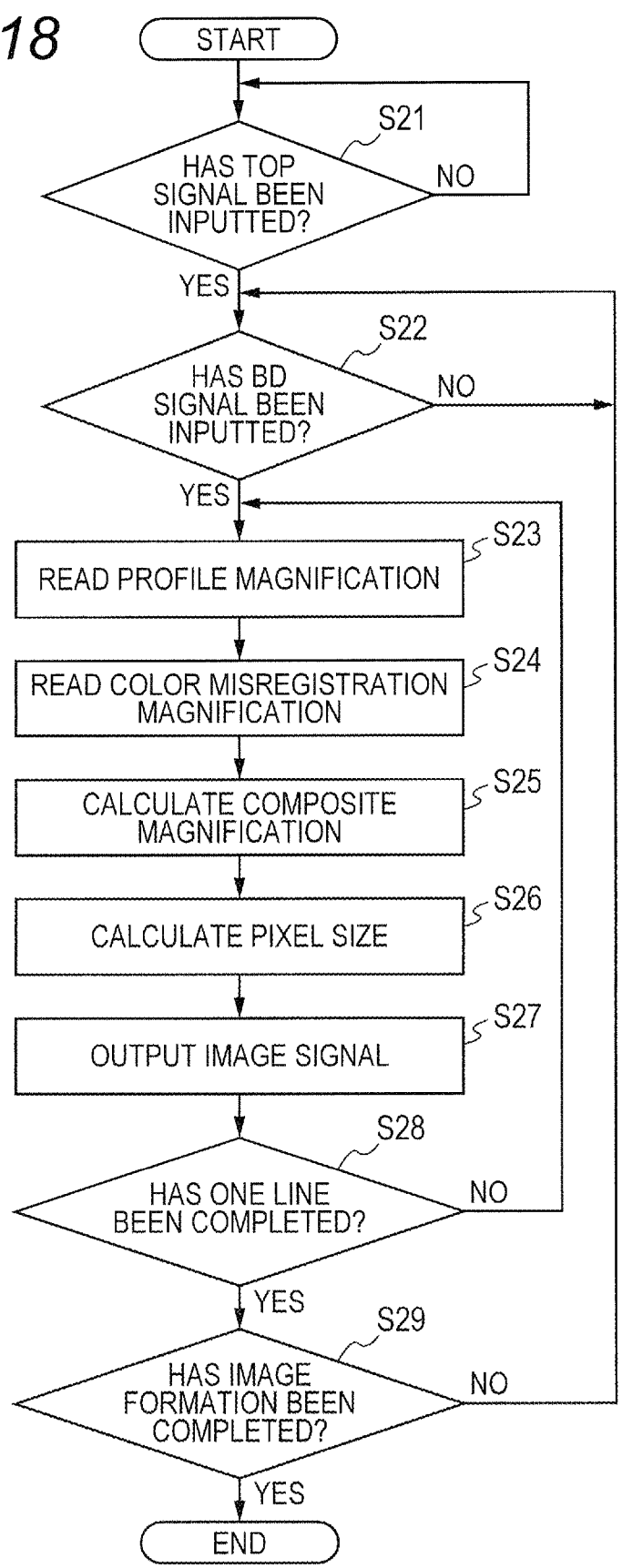
FIG. 18 is a flowchart for illustrating image forming control operation.
Figure 19:
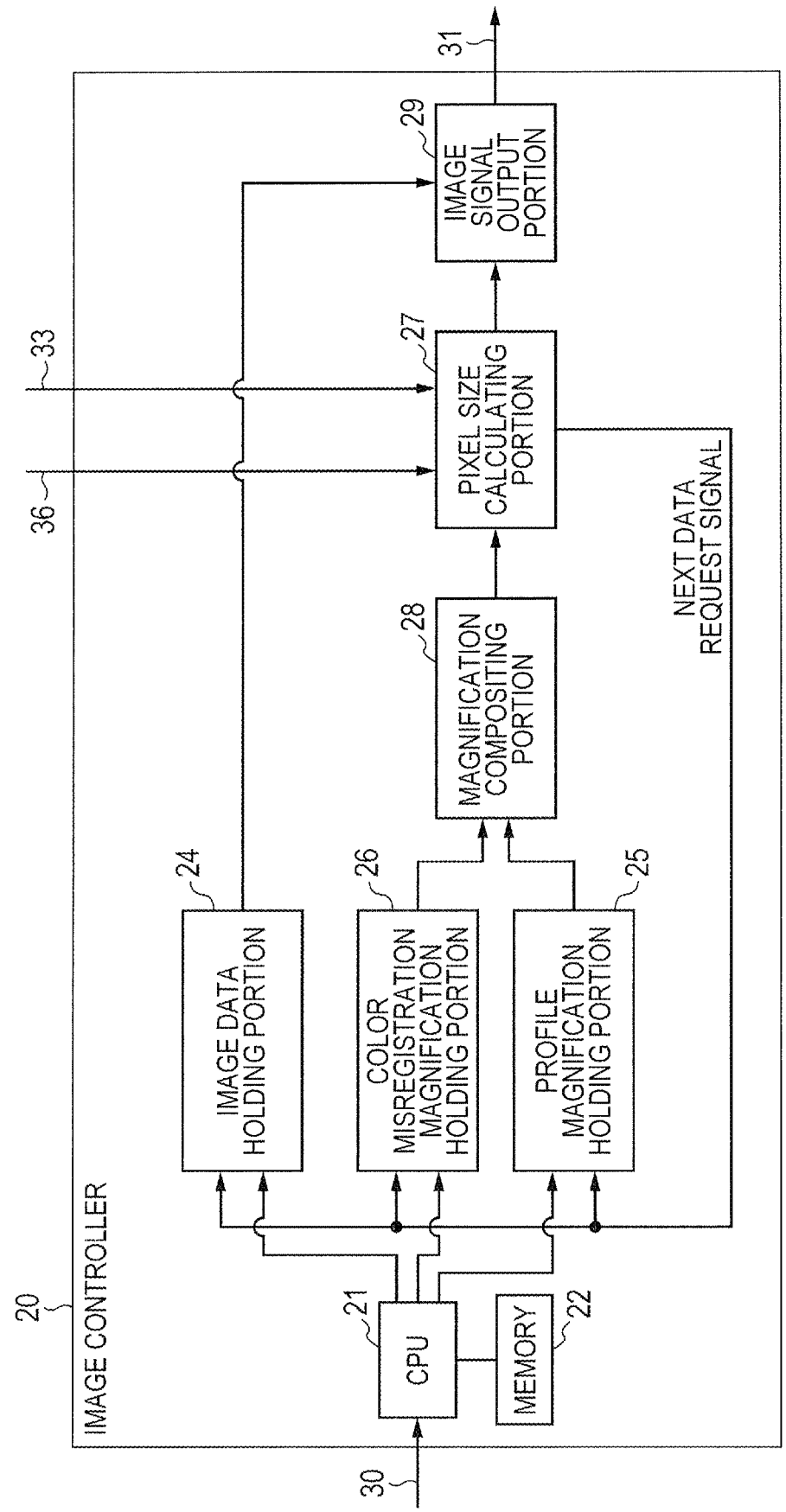
FIG. 19 is a block diagram of an image controller.

FIG. 18 is a flowchart for illustrating image forming control operation. FIG. 19 is a block diagram of the image controller 20. The image controller 20 includes a CPU 21, a memory 22, an image data holding portion 24, a profile magnification holding portion 25, a color misregistration magnification holding portion 26, a pixel size calculating portion 27, a magnification compositing portion 28, and an image signal output portion 29. The CPU executes image forming operation as programmed by a program that is stored in the memory 22. When the image forming control operation is started, the CPU 21 stores, in the image data holding portion 24, the image data 30 output from the image reading unit 700. The CPU 21 stores, in the profile magnification holding portion 25, the profile magnification with respect to the scanning position X, which has been obtained based on the measurement result of the profile measuring device 40. The CPU 21 stores, in the color misregistration magnification holding portion 26, the color misregistration magnification obtained from the detection result of the pattern detectors 726.

The CPU 21 determines whether a TOP signal 36 has been input to the pixel size calculating portion 27 (Step S21). The TOP signal 36 is a synchronization signal of the light beam in the sub scanning direction R1. The TOP signal is used to print the top (first line) of an image at an appropriate position of the sheet. When the TOP signal has been input (YES in Step S21), the CPU 21 determines whether a BD signal 33 has been input to the pixel size calculating portion 27 (Step S22). When the light beam deflected by the rotary polygon mirror 12 enters the BD 14, the BD 14 outputs the BD signal 33 to the pixel size calculating portion 27. When the BD signal 33 has been input (YES in Step S22), the pixel size calculating portion 27 starts processing on the first pixel of the first line with reference to the BD signal 33. First, the pixel size calculating portion 27 reads the profile magnification of the first pixel from the profile magnification holding portion 25 (Step S23). Next, the pixel size calculating portion 27 reads the color misregistration magnification from the color misregistration magnification holding portion 26 (Step S24). The pixel size calculating portion uses the magnification compositing portion 28 to calculate the composite magnification of the profile magnification and the color misregistration magnification with the use of Expression 4 (Step S25).

The pixel size calculating portion 27 calculates a pixel size based on the image data, the composite magnification, and an error amount at the time when the previous one pixel size is determined (Step S26). In other words, the pixel size calculating portion 27 determines to what size one pixel is enlarged, reduced, or maintained in terms of the magnification. The pixel size calculating portion 27 outputs the calculated pixel size to the image signal output portion 29. The image signal output portion 29 outputs, to the light source drive portion 18, the image signal 31 corresponding to one pixel based on the calculated pixel size and the image data in the image data holding portion 24 (Step S27). The light source drive portion 18 generates the drive signal 35 based on the image signal 31, and outputs the drive signal 35 to the light source 10. The light source 10 emits the light beam based on the drive signal 35 to form a latent image corresponding to one pixel on the photosensitive drum 708. The CPU 21 determines whether output of image signals 31 corresponding to one line has been completed (Step S28). When the output of the image signals 31 corresponding to one line has not been completed (NO in Step S28), the processing returns to Step S23. The CPU 21 similarly corrects a pixel size of the next pixel. When the output of the image signals 31 corresponding to one line has been completed (YES in Step S28), the CPU 21 determines whether the image formation has been completed (Step S29). When the image formation has not been completed (NO in Step S29), the processing returns to Step S22, and image signals 31 for the next line are generated. When the image formation has been completed (YES in Step S29), the CPU 21 ends the image formation.

Figure 20A:
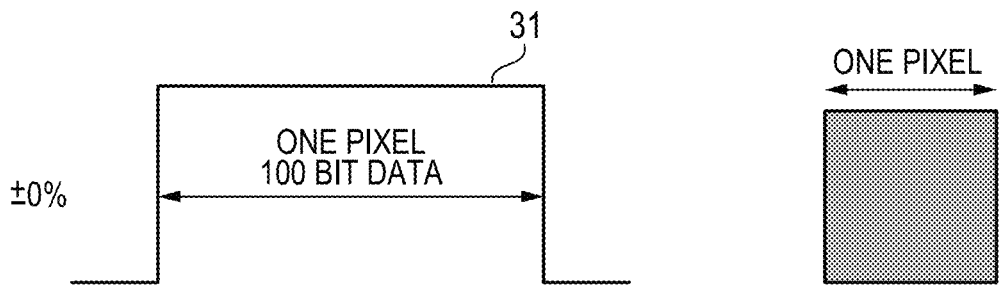
FIG. 20A, FIG. 20B, and FIG. 20C are diagrams for illustrating an image signal and a pixel size.
Figure 20B:
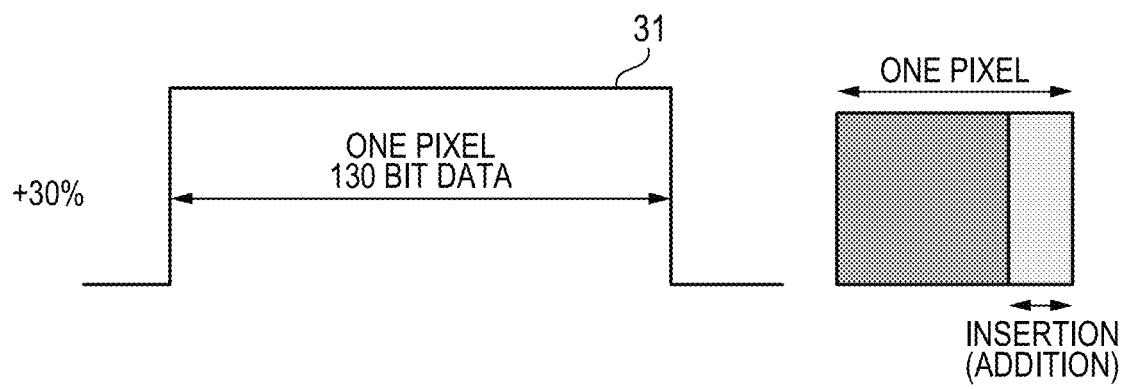
Figure 20C:
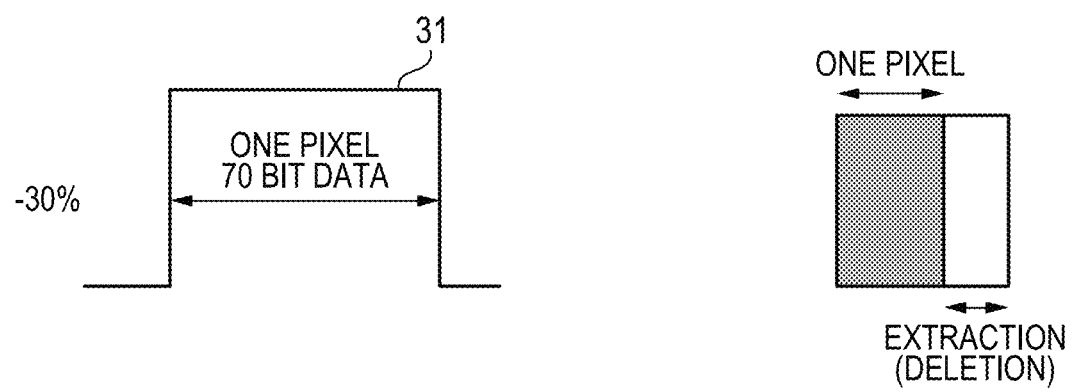

The determination of the size of one pixel and the output of the image signal 31 are described with reference to FIG. 20A, FIG. 20B, and FIG. 20C. FIG. 20A, FIG. 20B, and FIG. 20C are diagrams for illustrating the image signal 31 and the pixel size. The image data 30 is generated as a bit data group obtained by being divided by a predetermined integer value for each pixel. One pixel is formed of a predetermined integer number of bit data (tiny pixel pieces). Inserting (add) at least one bit data into a bit data group of one pixel, and extracting (deleting) at least one bit data from the bit data group of one pixel are referred to as "bit data insertion/extraction". The pixel size is a size (length) of one pixel in the main scanning direction MS. The size of one pixel in the main scanning direction MS is changed by the bit data insertion/extraction. When the size of one pixel is enlarged in the main scanning direction MS, at least one bit data is inserted into the bit data group of one pixel to increase the size of one pixel. When the size of one pixel is reduced in the main scanning direction MS, at least one bit data is extracted from the bit data group of one pixel to reduce the size of one pixel. In this manner, the magnification of the image in the main scanning direction MS can be changed by the bit data insertion/extraction.

For example, when the predetermined integer value is 100, one pixel of the image data 30 is formed of 100 bit data. When the magnification correction is not required, one pixel is formed of 100 bit data as illustrated in FIG. 20A. When the image is enlarged by +30% magnification correction, 30 bit data is added to the original one pixel, with the result that the corrected one pixel is formed of 130 bit data as illustrated in FIG. 20B. When the light beam is emitted from the light source 10 based on the image signal 31 formed of 130 bit data per pixel, an enlarged latent image is formed on the photosensitive drum 708. ON the contrary, when the image is reduced by −30% magnification correction, 30 bit data is deleted from the original one pixel, with the result that the corrected one pixel is formed of 70 bit data as illustrated in FIG. 20C. When the light beam is emitted from the light source 10 based on the image signal 31 formed of 70 bit data per pixel, a reduced latent image is formed on the photosensitive drum 708.

Figure 21:
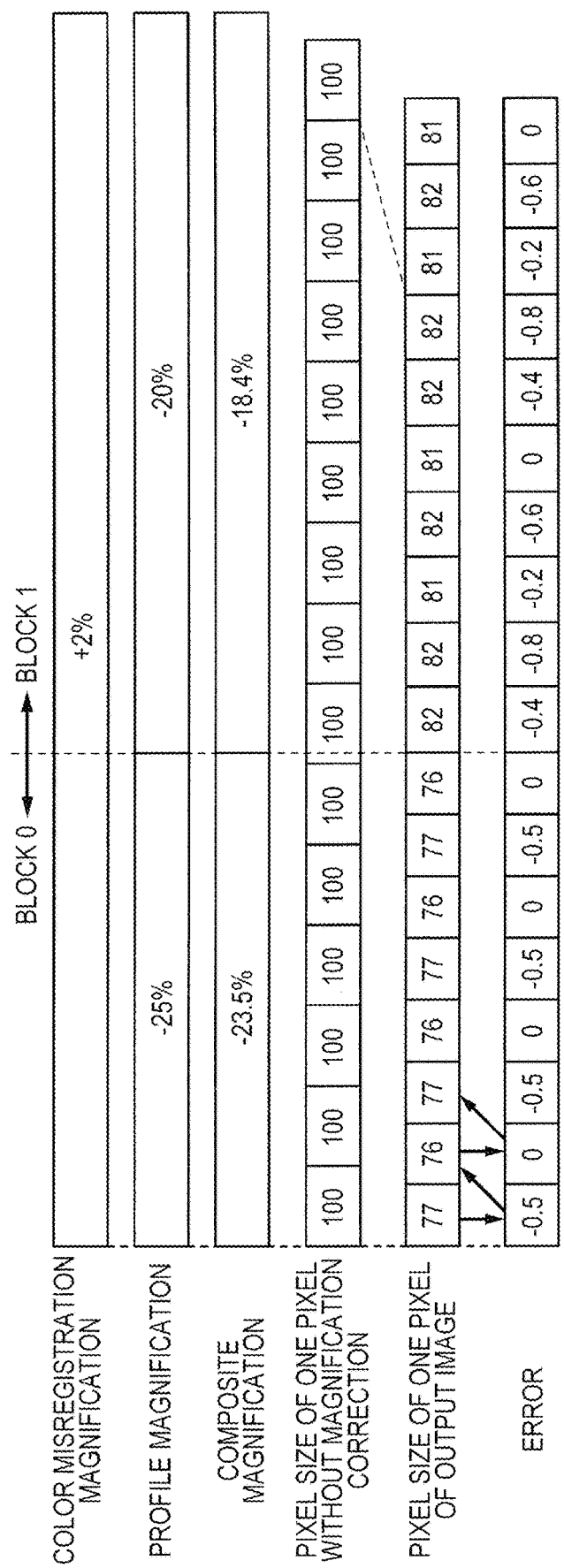
FIG. 21 is a diagram for illustrating magnifications and pixel sizes in continuous output operation of image signals.

FIG. 21 is a diagram for illustrating magnifications and pixel sizes in continuous output operation of image signals 31. A pixel size of one pixel without magnification correction is 100 bit data. The color misregistration magnification is +2%. The profile magnification is −25% for the first Block 0, and −20% for the next Block 1. The pixel size of the first pixel is changed, based on the composite magnification of −23.5% that has been calculated by the magnification compositing portion 28, from 100 bit data to 77 bit data by the pixel size calculating portion 27. The pixel size is 76.5 bit data in calculation, but is determined as 77 bit data because the image signal 31 is output in units of 1 bit data. Therefore, an error of −0.5 bit data is generated. The error of −0.5 bit data is used when a pixel size of the next pixel is determined. The next one pixel is also 76.5 bit data in calculation, but is output as 76 bit data based on the error of −0.5 bit data. Such calculation of the pixel size is repeated such that the image as a whole is scaled to a target magnification. Further, at around the center of FIG. 21, the block of the profile magnification, which has been described in the first embodiment, is switched from Block 0 to Block 1. When the block has been switched from Block 0 to Block 1, the profile magnification of −20% of Block 1 is read from the profile magnification holding portion 25. The magnification compositing portion 28 composites the profile magnification of −20% and the color misregistration magnification of +2% to generate the composite magnification of −18.4%. In Block 1, the pixel size is determined by the pixel size calculating portion 27 based on the composite magnification of −18.4%. Through insertion/extraction of bit data for each pixel based on the pixel size calculated as described above, the image data can be corrected to reduce the color misregistration of the image.

Figure 22:
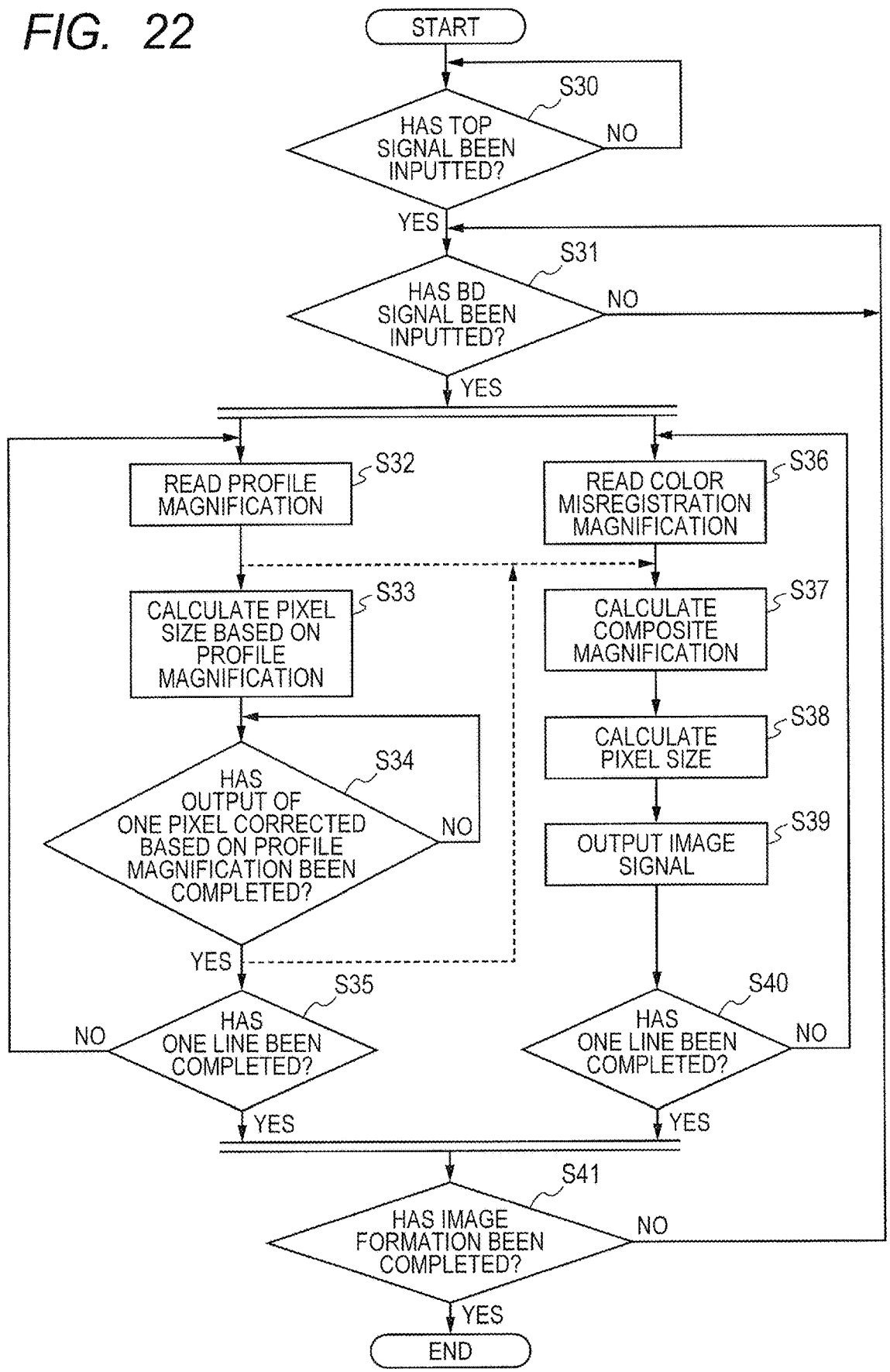
FIG. 22 is a flowchart for illustrating image forming control operation based on displacement between corrected pixel positions.
Figure 23:
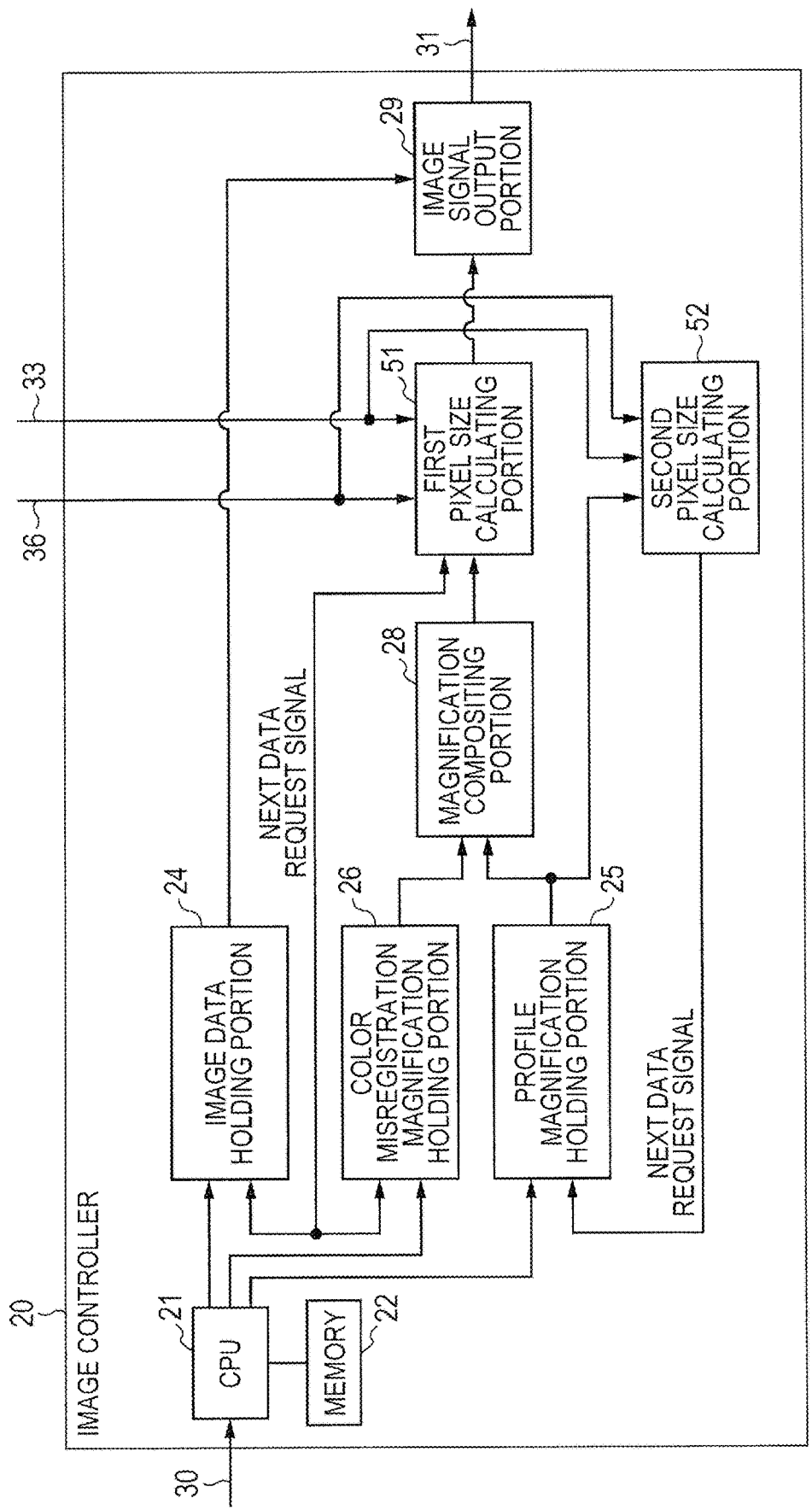
FIG. 23 is a block diagram of an image controller based on displacement between corrected pixel positions.

However, as in the first embodiment, the composite magnification correction is performed in synchronization with one pixel of the output image, and hence the corrected pixel position (first pixel position) of the composite magnification correction may be displaced from the corrected pixel position (second pixel position) of the profile magnification correction in some cases. When the profile magnification (correction amount) is large, the color misregistration may occur. To address this problem, in the second embodiment, the image data is corrected based on the displacement of the corrected pixel position between the composite magnification correction and the profile magnification correction. FIG. 22 is a flowchart for illustrating image forming control operation based on the displacement of the corrected pixel position. FIG. 23 is a block diagram of the image controller 20 based on the displacement of the corrected pixel position. The image controller 20 includes a CPU 21, a memory 22, an image data holding portion 24, a profile magnification holding portion 25, a color misregistration magnification holding portion 26, a first pixel size calculating portion 51, a second pixel size calculating portion 52, a magnification compositing portion 28, and an image signal output portion 29. The CPU 21 executes the image forming operation as programmed by a program that is stored in the memory 22. When the image forming control operation is started, the CPU 21 stores the image data in the image data holding portion 24. The CPU 21 stores, in the profile magnification holding portion 25, the profile magnification with respect to the scanning position X, which is obtained from the measurement result of the profile measuring device 40. The CPU 21 stores, in the color misregistration magnification holding portion 26, the color misregistration magnification obtained from the detection result of the pattern detectors 726.

The CPU 21 determines whether a TOP signal 36 has been input to the first pixel size calculating portion 51 and the second pixel size calculating portion 52 (Step S30). When the TOP signal 36 has been input (YES in Step S30), the CPU 21 determines whether a BD signal 33 has been input to the first pixel size calculating portion 51 and the second pixel size calculating portion 52 (Step S31). When the BD signal 33 has been input (YES in Step S31), the first pixel size calculating portion 51 and the second pixel size calculating portion 52 read the profile magnification of the first pixel from the profile magnification holding portion 25 (Step S32). The second pixel size calculating portion 52 calculates the pixel size based on the profile magnification (Step S33). In other words, the second pixel size calculating portion 52 determines to what size one pixel is enlarged, reduced, or maintained in terms of the magnification. The second pixel size calculating portion 52 outputs the calculated pixel size to the profile magnification holding portion 25. The CPU 21 determines whether output of one pixel corrected based on the profile magnification has been completed (Step S34). When the output of one pixel corrected based on the profile magnification has been completed (YES in Step S34), the CPU 21 determines whether output of image signals 31 corresponding to one line has been completed (Step S35). When the output of the image signals 31 corresponding to one line has not been completed (NO in Step S35), the processing returns to Step S32. The CPU 21 similarly corrects the pixel size of the next pixel based on the profile magnification. When the output of the image signals 31 corresponding to one line has been completed (YES in Step S35), the CPU 21 determines whether the image formation has been completed (Step S41). When the image formation has not been completed (NO in Step S41), the processing returns to Step S31, and the image signals 31 for the next line are generated.

Meanwhile, in parallel to the correction of the pixel size based on the profile magnification by the second pixel size calculating portion 52 described above, the first pixel size calculating portion 51 reads the color misregistration magnification from the color misregistration magnification holding portion 26 (Step S36). The first pixel size calculating portion 51 uses the magnification compositing portion 28 to calculate the composite magnification of the profile magnification and the color misregistration magnification with the use of Expression 4 (Step S37). The first pixel size calculating portion 51 calculates the pixel size based on the image data, the composite magnification, and the error amount at the time when the previous one pixel size is determined (Step S38). In other words, the first pixel size calculating portion 51 determines to what size one pixel is enlarged, reduced, or maintained in terms of magnification. The first pixel size calculating portion 51 outputs the calculated pixel size to the image signal output portion 29. The image signal output portion 29 outputs, to the light source drive portion 18, the image signal 31 corresponding to one pixel based on the calculated pixel size and the image data in the image data holding portion 24 (Step S39). The light source drive portion 18 generates the drive signal 35 based on the image signal 31, and outputs the drive signal 35 to the light source 10. The light source 10 emits the light beam based on the drive signal 35 to form a latent image corresponding to one pixel on the photosensitive drum 708. The CPU 21 determines whether output of image signals 31 corresponding to one line has been completed (Step S40). When the output of the image signals 31 corresponding to one line has not been completed (NO in Step S40), the processing returns to Step S36. The CPU 21 similarly corrects a pixel size of the next pixel. When the output of the image signals 31 corresponding to one line has been completed (YES in Step S40), the CPU 21 determines whether the image formation has been completed (Step S41). When the image formation has not been completed (NO in Step S41), the processing returns to Step S31, and image signals 31 for the next line are generated. When the image formation has been completed (YES in Step S41), the CPU 21 ends the image formation.

Figure 24:
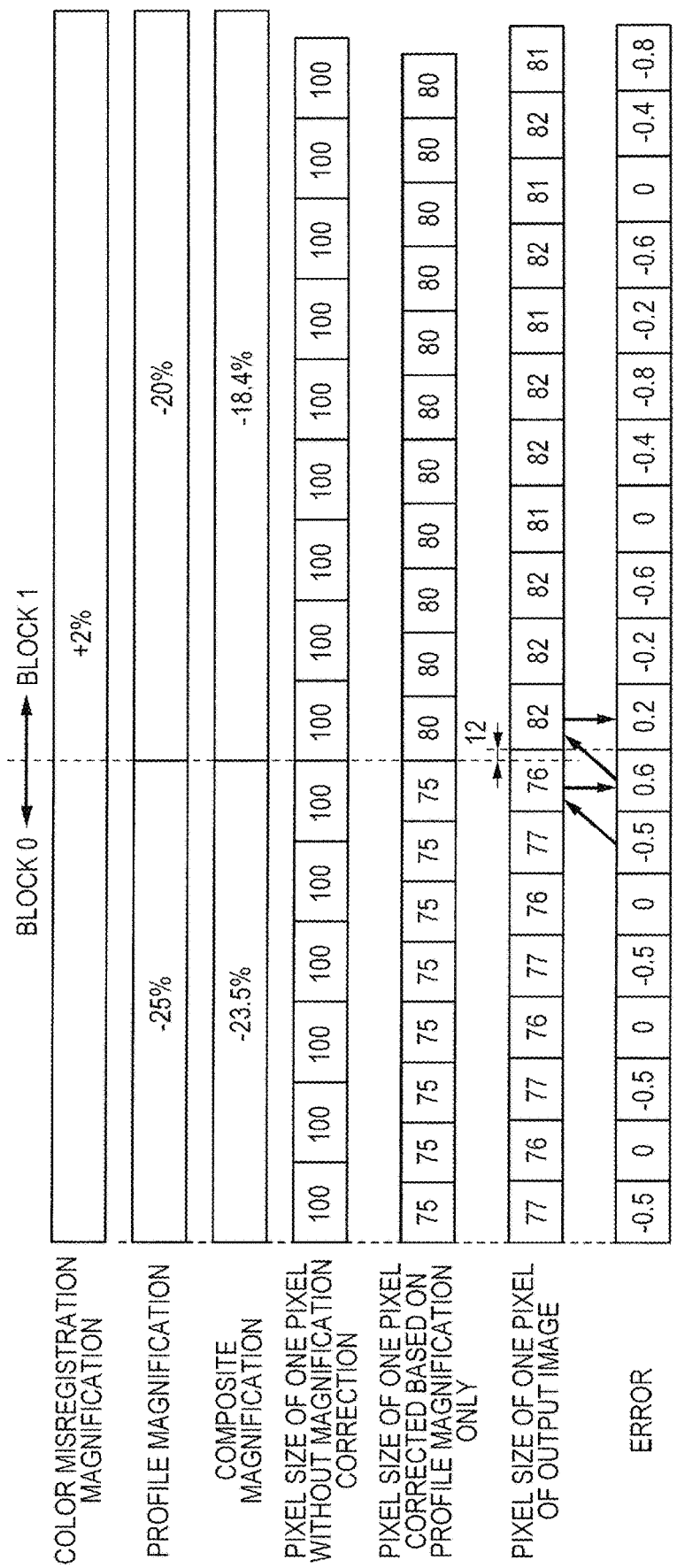
FIG. 24 is a diagram for illustrating magnifications and pixel sizes in continuous output operation of image signals.

FIG. 24 is a diagram for illustrating magnifications and pixel sizes in continuous output operation of image signals 31. A pixel size of one pixel without magnification correction is 100 bit data. The color misregistration magnification is +2%. The profile magnification is −25% for the first Block 0, and −20% for the next Block 1. The pixel size of the first pixel is changed, based on the profile magnification of −25% only, from 100 bit data to 75 bit data by the second pixel size calculating portion 52. In this example, an error of less than 1 bit data is not generated by the correction based on the profile magnification only, and hence the next pixel size is calculated without an error. As a result, timing at which the second pixel size calculating portion 52 reads the profile magnification of the next pixel from the profile magnification holding portion 25 and calculates the pixel size of the next pixel based on the profile magnification only is when time corresponding to 75 bit data has elapsed.

In parallel to the calculation of the pixel size based on the profile magnification only by the second pixel size calculating portion 52, the pixel size of the first pixel is determined as 77 bit data by the first pixel size calculating portion 51 based on the composite magnification of −23.5%. The pixel size is 76.5 bit data in calculation, but is determined as 77 bit data because the image signal 31 is output in units of 1 bit data. Therefore, an error of −0.5 bit data is generated. The error of −0.5 bit data is used when the pixel size of the next pixel is determined. As a result, timing at which the first pixel size calculating portion 51 reads the color misregistration magnification of the next pixel from the color misregistration magnification holding portion 26 and determines the pixel size based on the composite magnification is when time corresponding to 77 bit data has elapsed.

As described above, the timing at which the pixel size is calculated based on the composite magnification is displaced from the timing at which the pixel size is calculated based on the profile magnification only. As illustrated at around the center of FIG. 24, the profile magnification is changed when the block transitions from Block 0 to Block 1. In this example, 76 bit data at the time when the block transitions from Block 0 to Block 1 is calculated based on the composite magnification of −23.5%. However, of 76 bit data, 12 bit data in Block 1 is to be determined based on the composite magnification of −18.4%. To address this problem, the first pixel size calculating portion 51 uses a displacement amount of the calculation timing of the pixel size as an error amount in the next calculation of the pixel size. The last pixel size of Block 0 illustrated in FIG. 24 is calculated as 76 bit data with the use of 76.5 bit data determined from the composite magnification of −23.5% and the error of −0.5 bit data from the previous pixel. It is determined that there is no error amount for use in calculation of the pixel size of the next pixel, and the block of the profile magnification is switched from Block 0 to Block 1. Based on the difference between the timing at which the pixel size is calculated based on the composite magnification (first timing) and the timing at which the pixel size is calculated based on the profile magnification only (second timing), only 12 bit data of 76 bit data is required to be corrected. 12 bit data is excessively reduced by 5.1% (=−18.4%−(−23.5%)) corresponding to the change of the composite magnification. In order to correct the excessive reduction, 0.6 bit data (=12 bit data×5.1%) is used as the error amount when the pixel size of the next pixel is calculated.

According to the second embodiment, the difference (displacement amount) between the first timing at which the pixel size is determined based on the profile magnification and the second timing at which the pixel size is determined based on the composite magnification can be used to correct the image data based on the composite magnification. Therefore, as in the first embodiment, the image with the reduced color misregistration can be formed.

According to the second embodiment, there can be reduced the color misregistration at the time when the profile magnification (first magnification) and the color misregistration magnification (second magnification) of the image in the main scanning direction are corrected in combination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-068629, filed Mar. 30, 2017, which is hereby incorporated by reference herein in its entirety.

What is claimed is:

1. An image forming apparatus, comprising:
an image forming portion including:
(i) a first photosensitive member on which a toner image of a reference color for color misregistration correction is formed;
(ii) a plurality of photosensitive members on which toner images of different colors from the first photosensitive member are formed; and
(iii) a scanning unit having a plurality of light sources configured to emit light beams based on image signals, the scanning unit being configured to scan the light beams, emitted from the plurality of light sources, on respective photosensitive members,
wherein the image forming portion is configured to form color misregistration measurement toner patterns for measuring displacement amounts of other colors with respect to the reference color;
an optical sensor configured to detect the color misregistration measurement toner patterns;
a storage portion configured to store profile data of an image with respect to a scanning position in a main scanning direction, the profile data including data which is generated based on a profile representing change in a scanning speed of the light beam scanning the photosensitive member with respect to each of a plurality of scanning positions in the main scanning direction and which corresponds to each of the plurality of scanning positions in the main scanning direction, the profile data being provided for each of colors; and
a controller configured to:
(i) execute a first magnification correction process, based on a detection result of the color misregistration measurement toner pattern, on image data of the other colors than the reference color;
(ii) execute a second magnification correction process, based on the profile data, on image data of the reference color and image data corrected in the first magnification correction process; and
(iii) control the plurality of light sources corresponding to the image data, respectively, based on image data corrected in the second magnification correction process.

2. An image forming apparatus according to claim 1, wherein the profile data with respect to the scanning position is a profile indicating a magnification of each of a plurality of areas in the main scanning direction.

3. An image forming apparatus, comprising:
an image forming portion including:
(i) a first photosensitive member on which a toner image of a reference color for color misregistration correction is formed;
(ii) a plurality of photosensitive members on which toner images of different colors from the first photosensitive member are formed; and
(iii) a scanning unit having a plurality of light sources configured to emit light beams based on image signals, the scanning unit being configured to scan the light beams, emitted from the plurality of light sources, on respective photosensitive members,
wherein the image forming portion is configured to form color misregistration measurement toner patterns for measuring displacement amounts of other colors with respect to the reference color;
an optical sensor configured to detect the color misregistration measurement toner patterns;
a storage portion configured to store profile data of an image with respect to a scanning position in a main scanning direction, the profile data including data which is generated based on a profile representing change in a scanning speed of the light beam scanning the photosensitive member with respect to each of a plurality of scanning positions in the main scanning direction and which corresponds to each of the plurality of scanning positions in the main scanning direction, the profile data being provided for each of colors; and
a controller configured to:
(i) execute a first magnification correction process, based on a detection result of the color misregistration measurement toner pattern, on image data of the other colors than the reference color;
(ii) execute a second magnification correction process, based on the profile data, on image data of the reference color and image data corrected in the first magnification correction process; and
(iii) control the plurality of light sources corresponding to the image data, respectively, based on image data corrected in the second magnification correction process, and based on a difference between a first timing at which the image signal is corrected in the first magnification correction process and a second timing at which the plurality of light sources are controlled by the controller.

4. An image forming apparatus according to claim 3, wherein profile data with respect to the scanning position is a profile indicating a magnification of each of a plurality of areas in the main scanning direction.

* * * * *